United States Patent
Miyahara

(10) Patent No.: US 10,162,539 B2
(45) Date of Patent: Dec. 25, 2018

(54) INFORMATION PROCESSING APPARATUS, INFORMATION PROCESSING METHOD, AND INFORMATION PROCESSING SYSTEM

(71) Applicant: Ryosuke Miyahara, Tokyo (JP)

(72) Inventor: Ryosuke Miyahara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 44 days.

(21) Appl. No.: 15/072,733

(22) Filed: Mar. 17, 2016

(65) Prior Publication Data
US 2016/0274807 A1 Sep. 22, 2016

(30) Foreign Application Priority Data
Mar. 20, 2015 (JP) .................................. 2015-058393

(51) Int. Cl.
G06F 3/06 (2006.01)
G06F 3/12 (2006.01)

(52) U.S. Cl.
CPC .......... *G06F 3/0619* (2013.01); *G06F 3/0605* (2013.01); *G06F 3/0631* (2013.01); *G06F 3/0632* (2013.01); *G06F 3/0634* (2013.01); *G06F 3/0671* (2013.01); *G06F 3/0673* (2013.01); *G06F 3/1204* (2013.01); *G06F 3/128* (2013.01); *G06F 3/1258* (2013.01)

(58) Field of Classification Search
CPC .... G06F 3/0619; G06F 3/0605; G06F 3/0671; G06F 3/0673; G06F 3/1204; G06F 3/1258; G06F 3/0631; G06F 3/0629; G06F 3/0634; G06F 3/0683; G06F 3/128
See application file for complete search history.

(56) References Cited

U.S. PATENT DOCUMENTS

| | | | | | |
|---|---|---|---|---|---|
| 5,469,270 | A | * | 11/1995 | Yamamoto | G11B 27/028 360/13 |
| 6,944,793 | B1 | * | 9/2005 | Parker | G06F 11/3006 702/188 |
| 7,941,621 | B1 | * | 5/2011 | Gipp | G06F 11/1456 711/162 |
| 8,850,132 | B1 | * | 9/2014 | Dhavale | G06F 13/28 711/147 |

(Continued)

FOREIGN PATENT DOCUMENTS

JP 2009-223699 10/2009

OTHER PUBLICATIONS

European Search Report, EP16159968, Aug. 19, 2016.

*Primary Examiner* — Michael Krofcheck
(74) *Attorney, Agent, or Firm* — Duft Bornsen, PC

(57) ABSTRACT

An information processing apparatus includes circuitry that controls mounting or unmounting of a specified storage area to an operating system on the information processing apparatus and a memory that stores a first mount status indicating whether or not mounting or unmounting operation is performed to the information processing apparatus and a second mount status indicating whether or not the specified storage area is mounted. The circuitry presents the specified storage area as an available mounted storage area to a user if the second mount status indicates that the specified storage area is mounted, and does not present the specified storage area as the available storage area if the second mount status indicates that the storage area is not mounted.

10 Claims, 14 Drawing Sheets

(56) References Cited

U.S. PATENT DOCUMENTS

| | | | | |
|---|---|---|---|---|
| 9,753,804 | B1* | 9/2017 | Sivertsen | G06F 11/1412 |
| 2002/0188697 | A1* | 12/2002 | O'Connor | H04L 43/00 |
| | | | | 709/219 |
| 2004/0123068 | A1* | 6/2004 | Hashimoto | G06F 12/0866 |
| | | | | 711/206 |
| 2009/0089460 | A1* | 4/2009 | Komoda | G06F 12/1458 |
| | | | | 710/13 |
| 2009/0234979 | A1* | 9/2009 | Hamasaki | G06F 3/0605 |
| | | | | 710/16 |
| 2011/0202715 | A1* | 8/2011 | Lee | G06F 3/0605 |
| | | | | 711/112 |
| 2011/0208942 | A1* | 8/2011 | Okutsu | G06F 13/385 |
| | | | | 711/170 |
| 2012/0203938 | A1* | 8/2012 | Nakajima | H04N 1/00127 |
| | | | | 710/19 |
| 2014/0229414 | A1* | 8/2014 | Goldberg | G06N 5/04 |
| | | | | 706/46 |
| 2014/0250320 | A1* | 9/2014 | Nyuunoya | G06F 11/2092 |
| | | | | 714/4.11 |
| 2015/0074448 | A1* | 3/2015 | Ageishi | G06F 11/2007 |
| | | | | 714/4.11 |
| 2015/0160865 | A1* | 6/2015 | Hasegawa | G06F 3/0611 |
| | | | | 711/111 |
| 2015/0286427 | A1* | 10/2015 | Akirav | G06F 3/0619 |
| | | | | 711/103 |
| 2016/0103618 | A1* | 4/2016 | Iliadis | G06F 3/0611 |
| | | | | 711/154 |
| 2017/0124352 | A1* | 5/2017 | Zou | G06F 21/6281 |

* cited by examiner

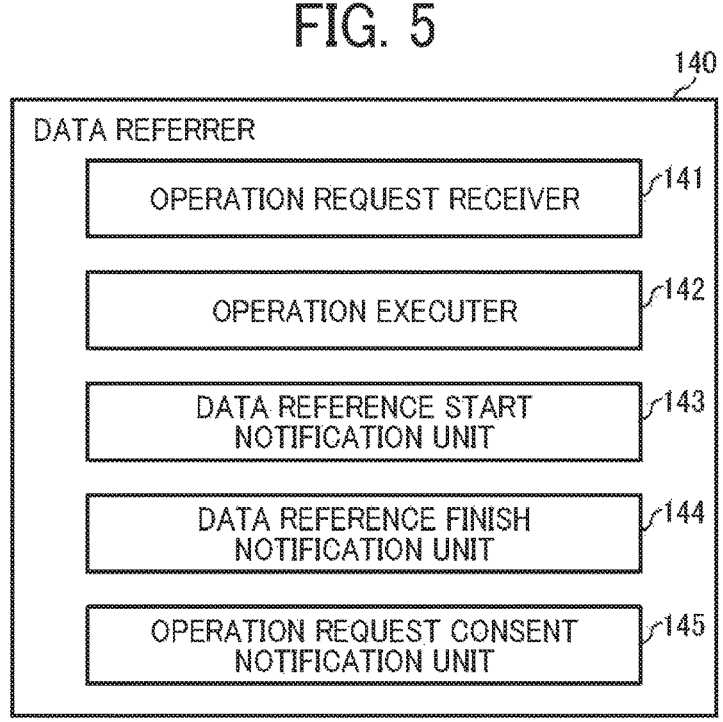
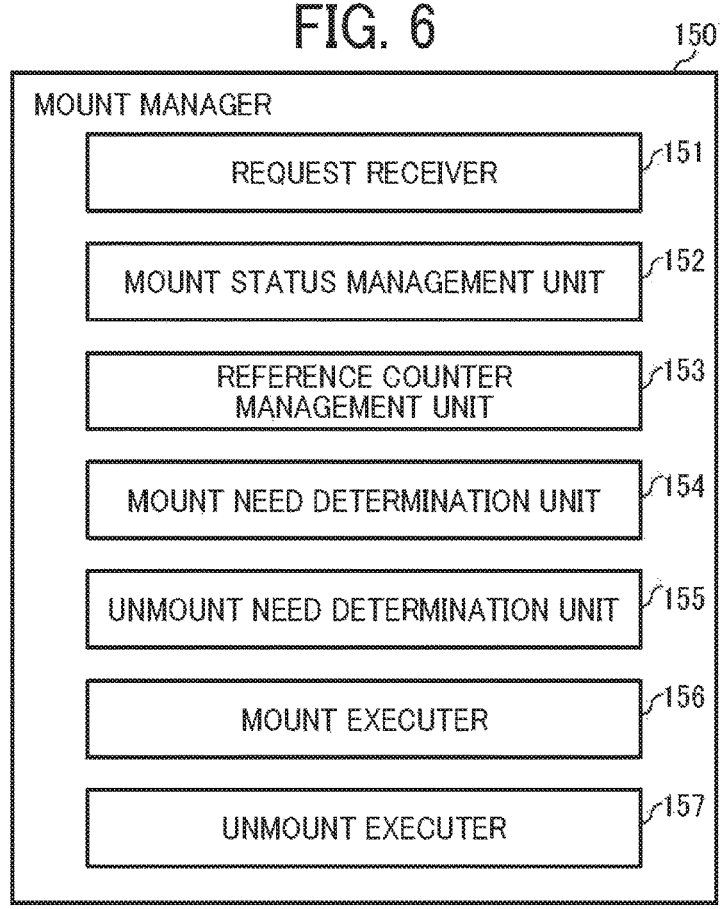

FIG. 7

| MOUNT POINT | NEED FOR AUTHENTICATION IN MOUNTING | MOUNT STATUS (SECOND MOUNT STATUS) | REFERENCE COUNTER |
|---|---|---|---|
| /mnt/001 | TRUE (AUTHENTICATION NEEDED) | TRUE (MOUNTED) | 1 |
| /mnt/002 | FALSE (NO NEED FOR AUTHENTICATION) | FALSE (UNMOUNTED) | 3 |
| /mnt/003 | TRUE (AUTHENTICATION NEEDED) | TRUE (MOUNTED) | 0 | ly, various information processing appara-
INFORMATION PROCESSING APPARATUS, INFORMATION PROCESSING METHOD, AND INFORMATION PROCESSING SYSTEM

CROSS-REFERENCE TO RELATED APPLICATIONS

This patent application is based on and claims priority pursuant to 35 U.S.C. § 119(a) to Japanese Patent Application No. 2015-058393, filed on Mar. 20, 2015 in the Japan Patent Office, the entire disclosures of which are hereby incorporated by reference herein.

BACKGROUND

Technical Field

The present invention relates to an information processing apparatus, an information processing method, and an information processing system.

Background Art

Conventionally, various information processing apparatuses such as image processing apparatuses, may be mounted with external storage devices (areas) to read data from the mounted storage areas or write data to the mounted storage areas. The external storage devices include such as a Universal Serial Bus (USB) memory, a hard disk drive (HDD) via USB, and file servers connected via networks.

In this disclosure, to "mount" is an action that allocates a necessary resource to refer a specified storage area in a system. In case of finishing using the storage areas once mounted, it is required to perform "unmount" as an operation that releases the resource allocated by mounting and keeps consistency of data in the storage areas.

SUMMARY

Example embodiments of the present invention provides a novel information processing apparatus includes circuitry that controls mounting or unmounting of a specified storage area to an operating system on the information processing apparatus and a memory that stores a first mount status indicating whether or not mounting or unmounting operation is performed to the information processing apparatus and a second mount status indicating whether or not the specified storage area is mounted. The circuitry presents the specified storage area as an available mounted storage area to a user if the second mount status indicates that the specified storage area is mounted, and does not present the specified storage area as the available storage area if the second mount status indicates that the storage area is not mounted.

Further embodiments of the present invention provide an information processing method, and an information processing system.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a diagram illustrating a functional configuration of a data referrer in FIG. 3 as an embodiment of the present invention.

FIG. 6 is a diagram illustrating a functional configuration of a mount manager in FIG. 3 as an embodiment of the present invention.

FIG. 7 is a diagram illustrating a mount information table as an embodiment of the present invention.

Figure 1:
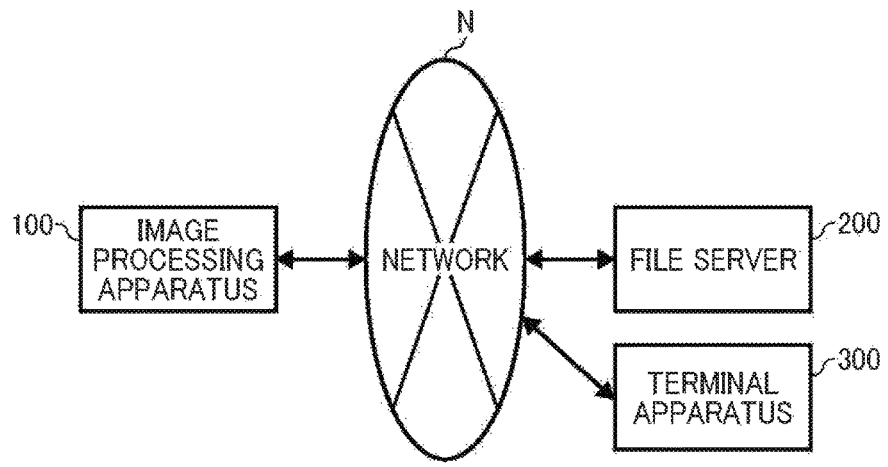
FIG. 1 is a diagram illustrating an image processing apparatus as an information processing apparatus as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the existing technologies, while the application reads data from the external storage device and writes data to the external storage device, it is maintained that the external storage device is mounted, even after receiving a request to unmount the external storage device. Accordingly, it is possible to access data stored in the storage area by operating the information processing apparatus by user operation during that period of time. This issue is not preferable from a viewpoint of security.

It should be noted that a target of mount is not limited to a storage area in the external storage device.

In the embodiment described below, an information processing apparatus is provided, which notifies a user of a status of mount even while data is being read from the mounted storage area or data is being written in the mounted storage area.

FIG. 1 is a diagram illustrating an image processing apparatus as an information processing apparatus in this embodiment.

The image processing apparatus 100 in FIG. 1 is a digital multifunction peripheral (MFP) that includes various functions regarding image processing and image data processing such as scanning, printing, copying, facsimile communication, and image storing etc. The image processing apparatus 100, which is connected to a network N, can access a shared folder in a file server 200 and a terminal apparatus 300 connected to the same network N as external storage areas.

The network N can be either wired or wireless. It is also possible to use a peer-to-peer communication route as the network N.

Figure 2:
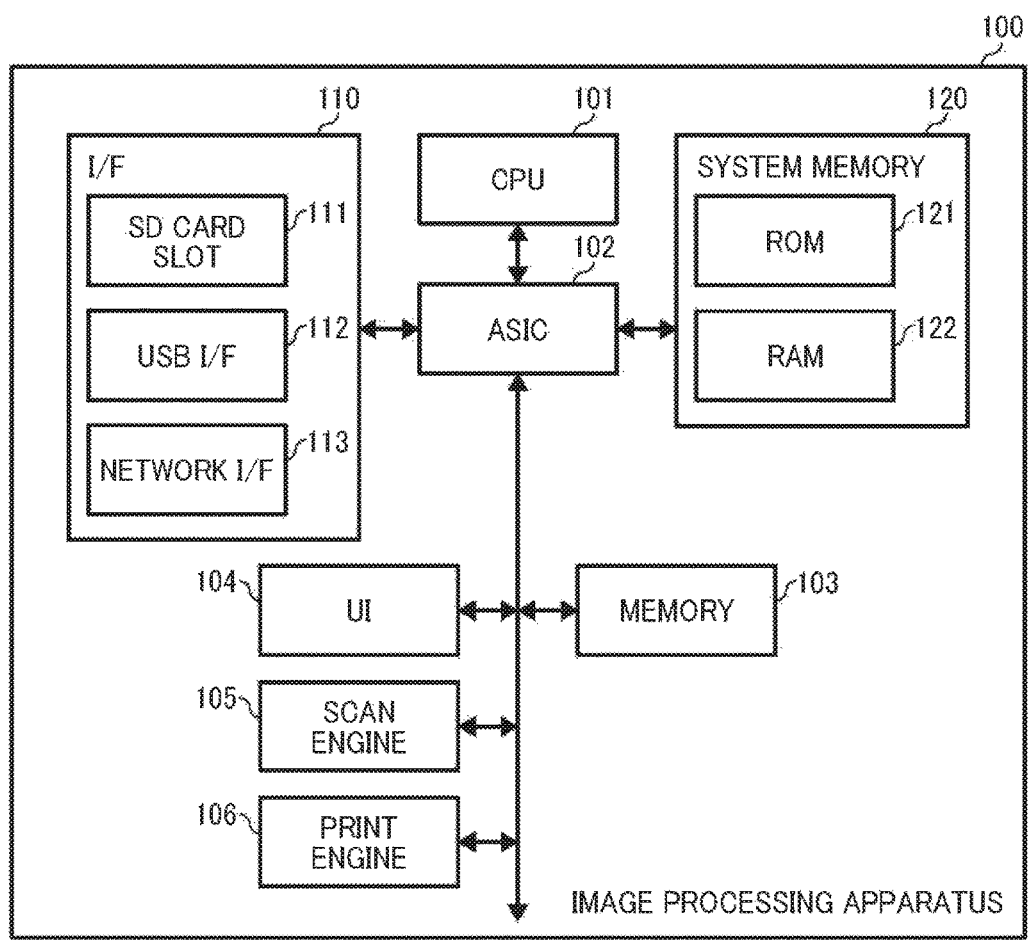
FIG. 2 is a diagram illustrating a hardware configuration of the image processing apparatus in FIG. 1 as an embodiment of the present invention.

FIG. 2 is a diagram illustrating a hardware configuration of the image processing apparatus 100 in this embodiment.

As illustrated in FIG. 2, the image processing apparatus 100 includes a CPU 101, an application specific integrated circuit (ASIC) 102, a memory 103, a user interface (U/I) 104, a scan engine 105, a print engine 106, an interface (I/F) unit 110, and a system memory 120.

The CPU 101 controls the entire image processing apparatus 100 by executing a program stored in the ROM 121 or the memory 103 using a RAM 122 in the system memory 120 as a work area, and various functions (such as functions described later with reference to FIG. 3) can be implemented.

The ASIC 102 is an IC for image processing that includes hardware for image processing and functions as a bridge that connects the CPU 101 to the units shown in FIG. 2. The memory 103 includes a storage medium magnetically, electrically, or optically recordable or rewritable, and stores programs that implement functions for controlling the image processing apparatus 100 and various configuration information etc. In addition, the memory 103 stores data etc. input via the scan engine 105 and the I/F 110.

The UI 104 is an interface between the image processing apparatus 100 and a user and includes a display such as a liquid crystal display (LCD) etc. and an input device such as a key switch etc. Under control of the CPU 101, the UI 104 displays various statuses of the apparatus and operating methods on the LCD, detects input via the touch panel and key switches by user operation, and outputs the input to the CPU 101.

The scan engine 105 includes a charge-coupled device (CCD) line sensor, an analog/digital (A/D) converter, and driving circuits, and the scan engine 105 generates 8-bit digital image data for RGB from tone information of a document acquired by scanning the set document and outputs the generated digital image data to the CPU 101.

Examples of the print engine 106 are a monochrome plotter, a one-drum color plotter, a four-drum color plotter, and a facsimile unit etc. It should be noted that the print engine 106 includes an image processing circuit such as error diffusion and gamma conversion etc. in addition to an engine unit such as the plotter etc.

The I/F 110 is an interface that connects the image processing apparatus 100 to external devices detachably and connects the image processing apparatus 100 to external devices via the network. More specifically, the I/F 110 includes a SD card slot 111 to which a SD card as an external storage device is inserted, a USB I/F 112 to which a USB flash memory as an external storage device is inserted, and a network I/F 113 for connecting to the network N. It should be noted that interfaces included in the I/F 110 are not limited to above interfaces.

The system memory 120 is used as a memory for storing programs and data, a memory for expanding programs and data, and a memory for rendering used by the printer etc., and the system memory 120 includes a RON 121 and a RAM 122. Here, the ROM 121 is a read-only memory used for storing programs and data, and the RAM 122 is a volatile readable/writable memory that can be used as a memory for expanding programs and data and a memory for drawing used by the printer etc.

The image processing apparatus 100 described above includes functions of mounting a storage area and unmounting a storage area. Those functions are described below in detail.

Figure 3:
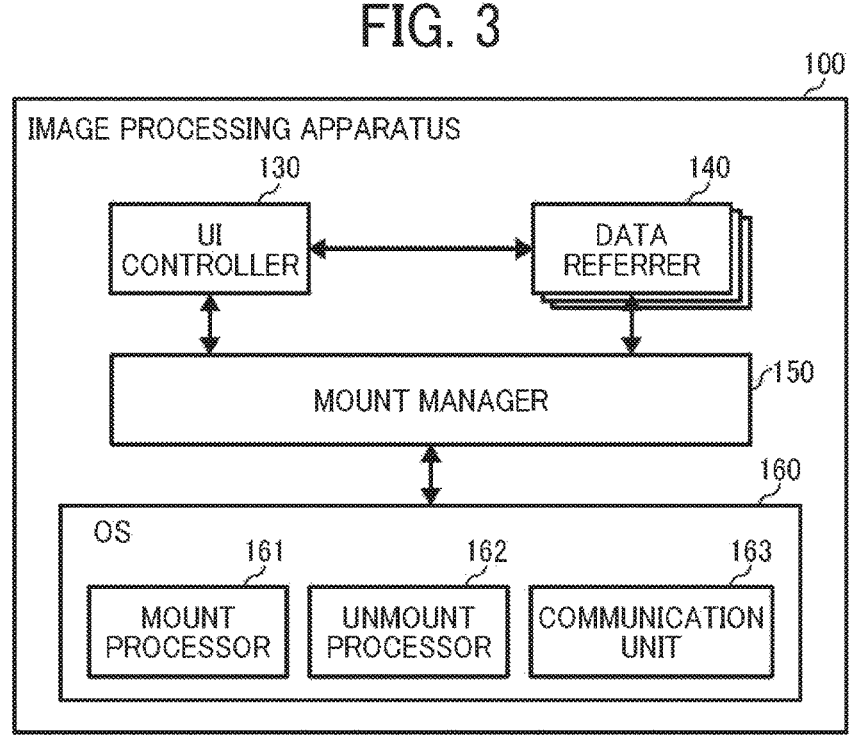
FIG. 3 is a diagram illustrating a functional configuration of the image processing apparatus in FIG. 1 as an embodiment of the present invention.

FIG. 3 is a diagram illustrating a functional configuration of the image processing apparatus 100 in this embodiment that uses data stored in a storage area available after being mounted.

As shown in FIG. 3, the image processing apparatus 100 includes functions such as a UI controller 130, a data referrer 140, a mount manager 150, and an operating system (OS) 160.

The UI controller 130 accepts various requests regarding operations of the image processing apparatus 100 by user operation and provides various information such as operation statuses and available functions of the image processing apparatus 100 to a user. In addition, the UI controller 130 requests the data referrer 140 and the mount manager 150 to perform operations in accordance with requests accepted from the user. Functions of the UI controller 130 are described later in detail with reference to FIG. 4.

The data referrer 140 includes a function that performs various operations using data stored in the mounted storage area in accordance with the operational requests from the UI controller 130. In performing those operations, the data referrer 140 provides information for managing mount statuses of the storage areas to the mount manager 150.

In one example, the operation includes an operation that reads image data and forms an image based on the image data on a sheet using the print engine 106. The operation further includes an operation that stores image data acquired by scanning a document using the scan engine 105. Furthermore, the operation can be an operation that reads/writes a configuration file and a log file. It is possible to include multiple data referrers 140 for each of types of operations to be performed such as a scanner application, a printer application, a document box application, and a configuration application etc. Functions of the data referrer 140 are described later in detail with reference to FIG. 5.

The mount manager 150 manages statuses of mounting storage areas (i.e., currently mounted or unmounted) and requests the OS 160 to perform a mounting process and an unmounting process in accordance with requests from the UI controller 130. As described later, timings and contents of the mounting process and the unmounting process that the mount manager 150 is requested by the UI controller 130 are not always the same as the mounting process and the unmounting process that the mount manager 150 requests the OS 160 to perform. Functions of the mount manager 150 are described later in detail with reference to FIG. 6.

The OS 160 includes basic functions to control hardware included in the image processing apparatus 100. The basic functions at least includes a mount processor (a mount processing unit) 161 that mounts a storage area and a unmount processor (a unmount processing unit) 162 that unmounts a storage area. Here, the basic functions also include a communication unit 163 that communicates with external apparatuses such as the file server 200 and the terminal apparatus 300, etc. via the network N.

Figure 4:
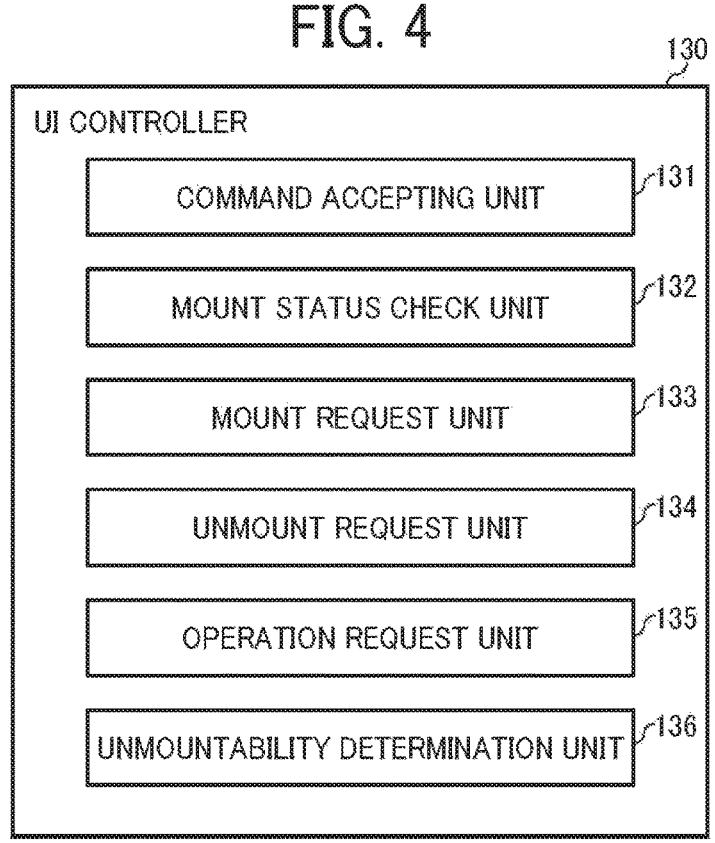
FIG. 4 is a diagram illustrating a functional configuration of an UI controller in FIG. 3 as an embodiment of the present invention.

Next, FIG. 4 is a diagram illustrating a detailed functional configuration of the UI controller 130 in this embodiment.

As illustrated in FIG. 4, the UI controller 130 includes a command accepting unit 131, a mount status check unit 132, a mount request unit 133, an unmount request unit 134, an operation request unit 135, and an unmountability determination unit (an unmountability determining unit) 136.

Among them, the command accepting unit 131 functions as various accepting units that accepts requests/commands for various operations using a graphical user interface (GUI) etc. by user operation. For example, the command accepting unit 131 accepts a request for mount specifying a target storage area, a request for unmount specifying a target storage area, a request for finishing using a storage area specifying the target storage area, a request for print specifying target data, and a request for other operation specifying target data.

It is possible to specify the storage area in units of devices such as the USB memory, the HDD, and the file server etc. Otherwise, it is possible to specify the storage area in accordance with divisions within the device such as partitions and folders etc.

The mount status check unit 132 queries the mount manager 150 to acquire information on which storage area is currently mounted. The command accepting unit 131 accepts specification of target data such as a command to print etc. among data stored in the mounted storage areas. Subsequently, the command accepting unit 131 provides user selections in accordance with the check result by the mount status check unit 132. In accepting a command to mount and a command to unmount, it is possible to accept a command providing the user mounting statuses of the storage areas in accordance with the check result by the mount status check unit 132.

Here, the mount manager 150 manages two types of information, that is, a first mount status indicating whether the storage area is mounted or the storage area is unmounted in accordance with results of actual mounting operation and unmounting operation, and a second mount status to be shown to a user. The mount status check unit 132 acquires information in accordance with the second mount status.

If the command accepting unit 131 accepts a command to perform a mount operation, the mount request unit 133 passes a mount request as a request for a mount operation in accordance with the command to the mount manager 150.

If the command accepting unit 131 accepts a command to perform an unmount operation, the unmount request unit 134 passes an unmount request as a request for an unmount operation in accordance with the command to the mount manager 150. In addition, the unmount request unit 134 requests to unmount in response to a command from the unmountability determination unit 136.

If the command accepting unit 131 accepts a command to perform various operations such as printing etc., the operation request unit 135 passes a request for the operation in accordance with the command to the data referrer 140 that performs the operation.

Based on a notification from the data referrer 140 etc., the unmountability determination unit 136 determines whether or not the storage area can be unmounted. For example, after receiving a notification that an operation in accordance with the request for the operation passed to the data referrer 140, in case of receiving a command to unmount automatically in accordance with the command to perform the operation, the unmountability determination unit 136 determines that the storage area used for the operation can be unmounted.

In addition, in case of determining that it is possible to unmount a storage area, the unmountability determination unit 136 instructs the unmount request unit 134 to transfer a request to unmount the storage area to the mount manager 150.

Next, FIG. 5 is a diagram illustrating a detailed functional configuration of the data referrer 140 in this embodiment.

As shown in FIG. 5, the data referrer 140 includes an operation request receiver 141, an operation executor 142, a data reference start notification unit 143, a data reference finish notification unit 144, and an operation request consent notification unit 145.

Among the units described above, the operation request receiver 141 receives a request for an operation passed from the operation request unit 135 in the UI controller 130.

The operation executor 142 executes an operation in accordance with the request for the operation received by the operation request receiver 141. The operation includes an operation that reads data and writes data accessing the mounted storage area if necessary. For example, in case of printing, the operation executor 142 reads specified image data from the storage area and instructs the print engine 106 to form an image based on the image data.

To access the mounted storage area in accordance with the execution of the operation by the operation executor 142, the data reference start notification unit 143 notifies the mount manager 150 of that.

If the operation executor 142 finishes executing the operation required to access the mounted storage area, the data reference finish notification unit 144 notifies the mount manager 150 of finishing of such operation.

If the operation executor 142 can start the operation in accordance with the request for the operation received by the operation request receiver 141, the operation request consent notification unit 145 notifies the UI controller 130 of starting of such operation. For example, it is possible to transfer the notification when the data reference start notification unit 143 transfers a notification that it is required to access the mounted storage area to the mount manager 150.

Next, FIG. 6 is a diagram illustrating a detailed functional configuration of the mount manager 150 in this embodiment.

As shown in FIG. 6, the mount manager 150 includes a request receiver 151, a mount status management unit 152, a reference counter management unit 153, a mount need determination unit 154, an unmount need determination unit 155, a mount executor 156, and an unmount executor 157.

Among the units described above, the request receiver 151 receives a request to mount passed from the mount request unit 133 in the UI controller 130 and a request to unmount passed from the unmount request unit 134 in the UI controller 130.

The mount status management unit 152 functions as a mount management unit that manages information used for controlling mounting and unmounting for mounted storage areas in the OS 160.

FIG. 7 is a diagram illustrating a mount information table used by the mount status management unit 152 to manage the information in this embodiment.

In the mount information table shown in FIG. 7, information on "mount point", "need for authentication in mounting", "mount status", and "reference counter" are registered for each storage area mounted in the OS 160.

Among the above information, a mount point that the OS allocates to the target storage area is registered in the "mount point". It is also possible to register information on address and path etc. regarding hardware including the target storage area or used for specifying an area inside the hardware along with the information.

Information indicating whether or not an authentication operation is required in instructing the OS 160 to mount the target mount point is registered in the "need for authentication in mounting". The information can be registered based on whether or not it is required to execute the authentication operation in requesting the OS 160 to mount actually.

Information on the second mount status as information on whether or not the target mount point is mounted to be shown to a user is registered in the "mount status". How to configure the information and meaning of the information are described later with reference to flowcharts in FIGS. 8 to 13.

The number of processes in the data referrer 140 using the target mount point is registered in the "reference counter". The number is counted by the reference counter management unit 153 based on notification from the data reference start notification unit 143 in the data referrer 140 and the data reference finish notification unit 144 in the data referrer 140. If one process refers to multiple files in one mount point, it is possible to count in the way that there are processes that use the mount point for each of the references.

In the mount information table described above, it is possible to register the information for each storage area if the OS 160 succeeds in mounting the storage area, and it is possible to delete the information for each storage area if the OS 160 succeeds in unmounting the storage area. In this case, the storage area whose information is registered in the mount information table is mounted in the OS 160, and the storage area whose information is not registered in the mount information table is not mounted in the OS 160. That is, whether or not it is registered in the mount information table itself indicates information on the first mount status indicating whether or not the storage area is mounted in the OS 160.

As a result, the mount status management unit 152 can manage the first mount status and the second mount status respectively for required storage area. It should be noted that the second mount status cannot be "mounted" if the first mount status is "unmounted". In this case, it is indicated that the storage area that is not mounted actually is mounted to user, and that is inconvenience. Therefore, it is controlled so that the image processing apparatus 100 does not enter into the status described above.

Now, the description goes back to FIG. 6.

The reference counter management unit 153 includes a function that counts the number of processes registered in the field "reference counter" in the mount information table as described above. In case of receiving a notification indicating that a storage area is to be accessed from the data reference start notification unit 143, the reference counter management unit 153 increments a count value associated with the storage area. By contrast, in case of receiving a notification indicating that it is finished to access a storage area from the data reference finish notification unit 144, the reference counter management unit 153 decrements a count value associated with the storage area.

In addition, the reference counter management unit 153 includes a function that reports to the unmount need determination unit 155 that the number of processes becomes zero after the decrement.

If the request receiver 151 receives the request to mount, the mount need determination unit 154 includes a function that determines whether or not it is required to instruct the OS 160 to perform the mounting operation in accordance with the request to mount. Its judgmental standard is described later with reference to the flowchart in FIG. 8.

If the request receiver 151 receives the request to unmount, the unmount need determination unit 155 includes a function that determines whether or not it is required to instruct the OS 160 to perform the unmounting operation in accordance with the request to unmount. Its judgmental standard is described later with reference to the flowchart in FIG. 13.

In addition, in case of receiving a notification indicating that the number of processes that refers to a storage area becomes zero from the reference counter management unit 153, the unmount need determination unit 155 includes a function that determines whether or not it is required to instruct the OS 160 to perform the unmounting operation. Its judgmental standard is described later with reference to the flowchart in FIG. 12.

If the mount need determination unit 154 determines that it is required to instruct the OS 160 to perform the mounting operation, the mount executor 156 includes a function that requests the OS 160 to perform the mounting operation specifying the target storage area. If the request is executed, the mount processor 161 in the OS 160 performs the mounting operation for the specified storage area.

In some cases, it is required to perform the authenticating operation in mounting. In that case, in accordance with the request from the OS 160, the mount executor 156 performs necessary requests to the UI controller 130 to acquire the authentication information input by user operation. Subsequently, the OS 160 is requested to perform the mounting operation along with the authentication information again.

If the unmount need determination unit 155 determines that it is required to instruct the OS 160 to perform the mounting operation, the unmount executor 157 includes a function that requests the OS 160 to perform the unmounting operation specifying the target storage area. If the request is executed, the unmount processor 162 in the OS 160 performs the unmounting operation for the specified storage area.

These mount executor 156, mount processor 161, unmount executor 157, and unmount processor 162 functions as a mount processing unit. It is also possible to consider that the mount executor 156 and the unmount executor 157 are a mount processing unit that performs the mounting operation and unmounting operation using the functions of the OS 160.

Next, specific operations of the image processing apparatus 100 using the functional units described above is described below.

Figure 8:
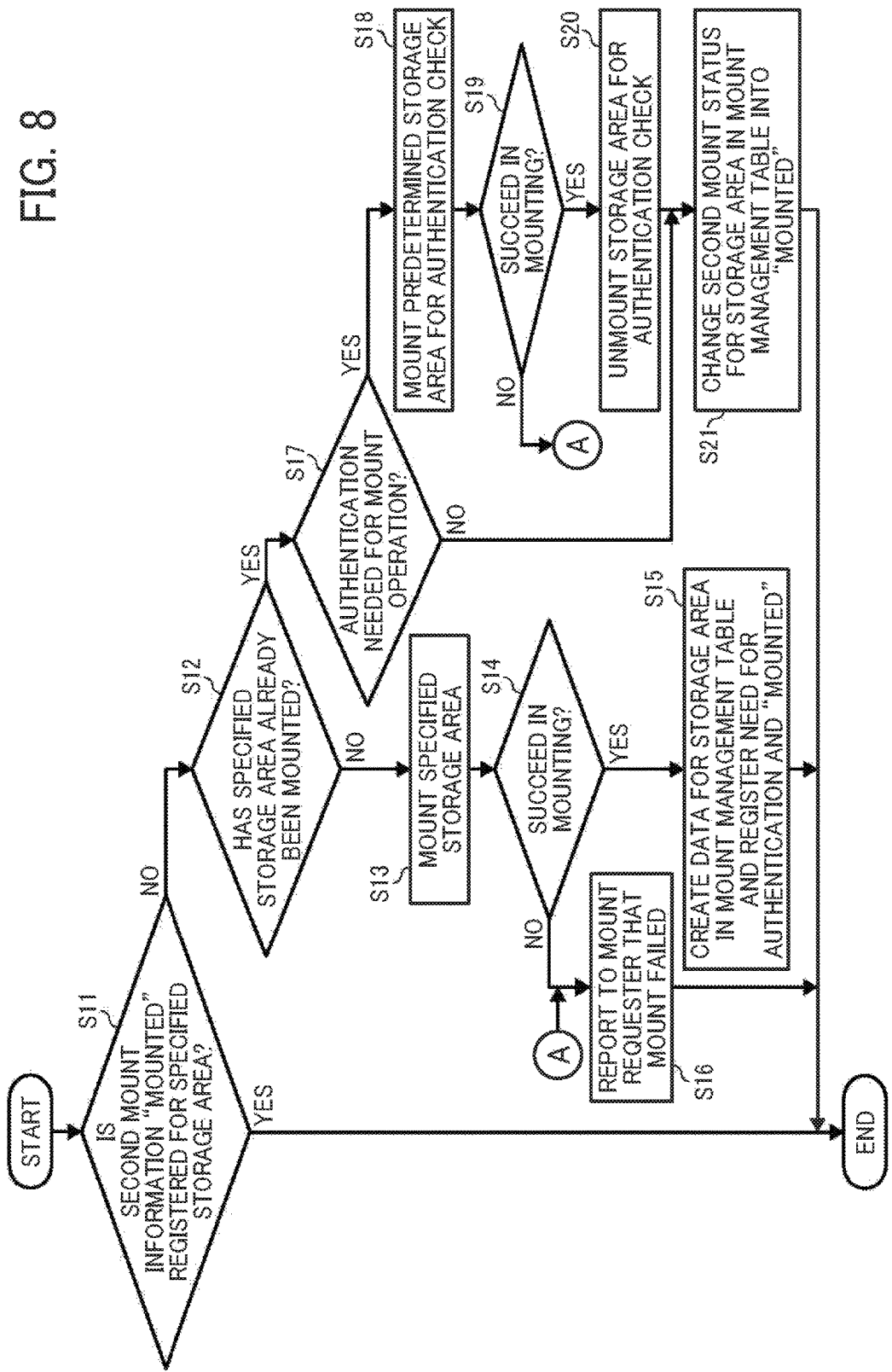
FIG. 8 is a flowchart illustrating an operation performed by the image processing apparatus in case of detecting a request for mount by user operation as an embodiment of the present invention.

First, FIG. 8 is a flowchart illustrating an operation in case of detecting a request to mount by user operation in this embodiment.

The operation shown in the flowchart in FIG. 8 is executed by the CPU 101 according to a predetermined program, to control hardware to function as the units shown in FIGS. 3 to 6.

After the command accepting unit 131 detects the request to execute the mounting operation from the user, the image processing apparatus 100 starts the operation in the flowchart in FIG. 8. The request to execute the mounting operation includes an instruction on specifying the storage area to be mounted. In addition, the command accepting unit 131 functions as a mount request accepting unit in accepting the command to execute.

In FIG. 8, first, regarding the specified storage area, the image processing apparatus 100 determines whether or not the second mount information "mounted" is registered in the mount information table in FIG. 7 in S11. If information regarding the target storage area itself is not registered in the mount information table, the determination in this case becomes NO. It should be noted that the corresponding relationship between the storage area and the mount point can be obtained through inquiring the OS 160. If the information is registered in the mount information table, it is possible to refer to the mount information table.

In case of YES in S11, since the specified storage area has already been mounted, the process ends.

By contrast, in case of NO in S11, next, the image processing apparatus 100 determines whether or not the specified storage area has already been mounted (i.e., the information is registered in the mount information table, the first mount information is "mounted") in S12.

In case of NO in S12, since it is required to instruct the OS 160 to perform the mounting operation, the image processing apparatus 100 performs the operation mounting the specified storage area using the functions of the mount executor 156 and the mount processor 161 in S13. In case of succeeding the mounting operation (YES in S14), data regarding the storage area is created in the mount management table. Based on whether or not authentication is requested in performing the mounting operation, information on whether or not the authentication is required is registered. At the same time, the "mounted" is registered as the second mount status in S15, and the process ends. The function of the mount status management unit 152 performs the operation in step S15.

By contrast, in case of failing in the mounting operation (NO in S14), the image processing apparatus 100 reports to the requester of the mounting operation (i.e., the user in this case) that the mounting operation failed in S16, and the process ends. For example, it is possible to report about failure by displaying a predetermined message. The function of the command accepting unit 131 performs the operation in step S16.

In addition, in case of YES in S12, the image processing apparatus 100 determines whether or not authentication is required for the mounting operation of the specified storage area in S17. Such determination may be made based on the information registered in the mount management table. Here, in case of NO, it is unnecessary to perform the redundant mounting operation for the specified storage area, and it is possible just to modify the information on whether or not it is mounted, which is to be displayed to the user. As a result, the image processing apparatus 100 changes the second mount information on the target storage area in the mount management table into "mounted" in S21, and the process ends. The function of the mount status management unit 152 also performs the operation in step S21.

By contrast, in case of YES in S17, before proceeding to S21, it is required to authenticate the user who requests to perform the mounting operation to check whether or not if the user is authorized to access the specified storage area. That is because it is unclear whether or not the user also requested to perform the mounting operation in the past.

Therefore, the image processing apparatus 100 performs the mounting operation for a predetermined storage area for the authentication using the functions of the mount executor 156 and the mount processor 161 in S18. Subsequently, after succeeding in the mounting operation (YES in S19), the unmounting operation is performed for the same storage area using the functions of the unmount executor 157 and the unmount processor 162 in S20, the second mount information is modified in S21, and the process ends.

That is because it is possible to allow the user who requests the command this time to mount in this case. However, it is unnecessary to mount the specified storage area again. In addition, since the storage area for checking the authentication is mounted just to perform the authentication, that storage area is unmounted immediately just after the mounting operation. A storage area that the same level of authentication is required as the specified storage area in mounting by the OS 160 is allocated for the storage area for checking the authentication preliminarily.

In case of NO in S19, since it is not permissible to allow the user who requests the command to mount, the step proceeds to S16, and the process ends after reporting that the mount failed.

As described above, in the operation in FIG. 8, the CPU 101 functions as a mount controlling unit (a mount controller). In addition, the operations in S11, S12, and S17 correspond to the function of the mount need determination unit 154.

Figure 9:
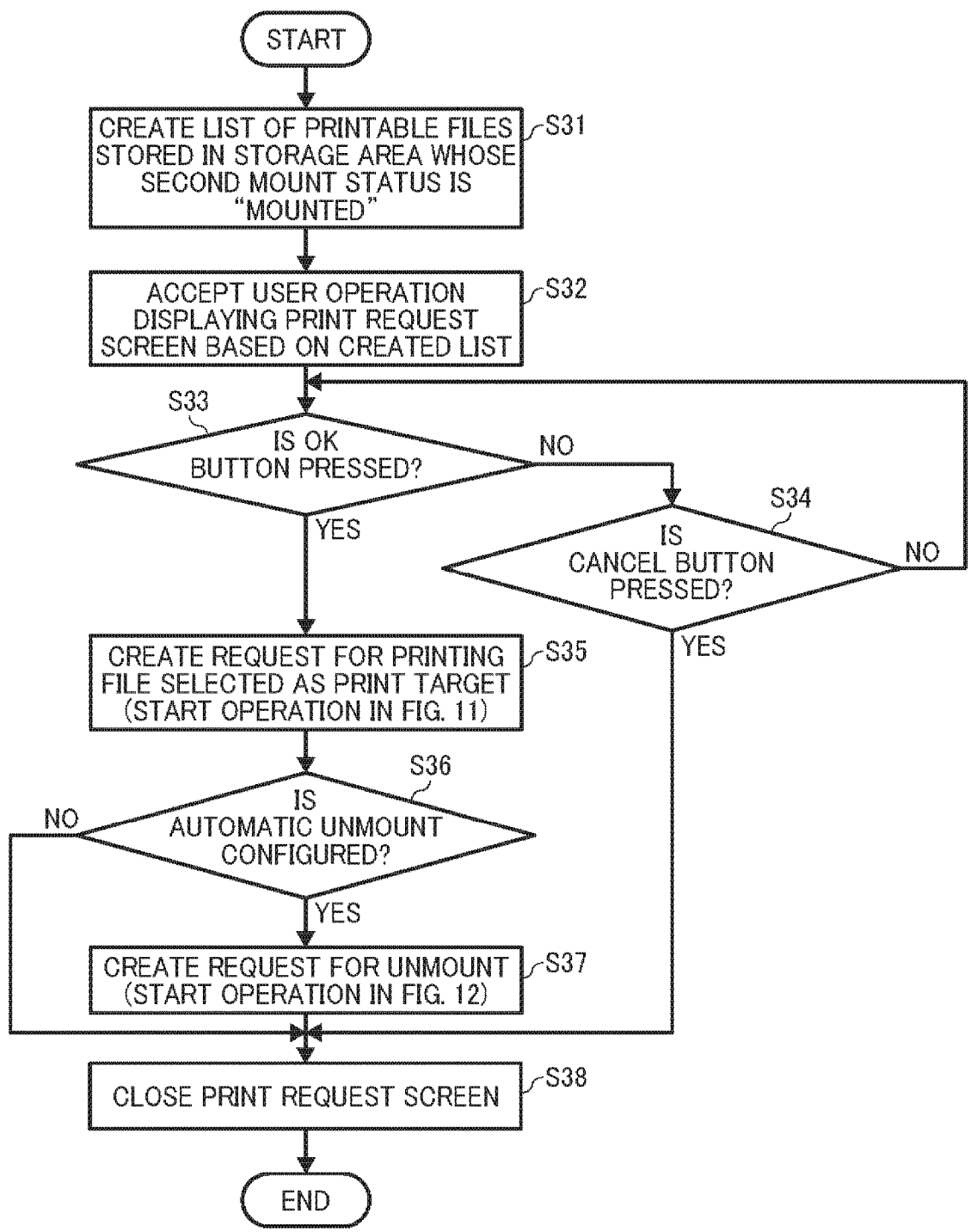
FIG. 9 is a flowchart illustrating an operation performed by the image processing apparatus in case of detecting a request to display a print request screen by user operation as an embodiment of the present invention.

Next, FIG. 9 is a flowchart illustrating an operation in case of detecting a request to display a print request screen by user operation in this embodiment.

After the command accepting unit 131 detects the request to display the print request screen from the user, the image processing apparatus 100 starts the operation in the flowchart in FIG. 9.

In FIG. 9, first, the image processing apparatus 100 refers to the mount management table and creates a list of printable files stored in a mount point (that mounts a storage area) whose second mount status is "mounted" in S31. Subsequently, based on the created list, a print request screen 400 in FIG. 10 is displayed on a LCD of the UI 104 to accept user operation in S32.

Figure 10:
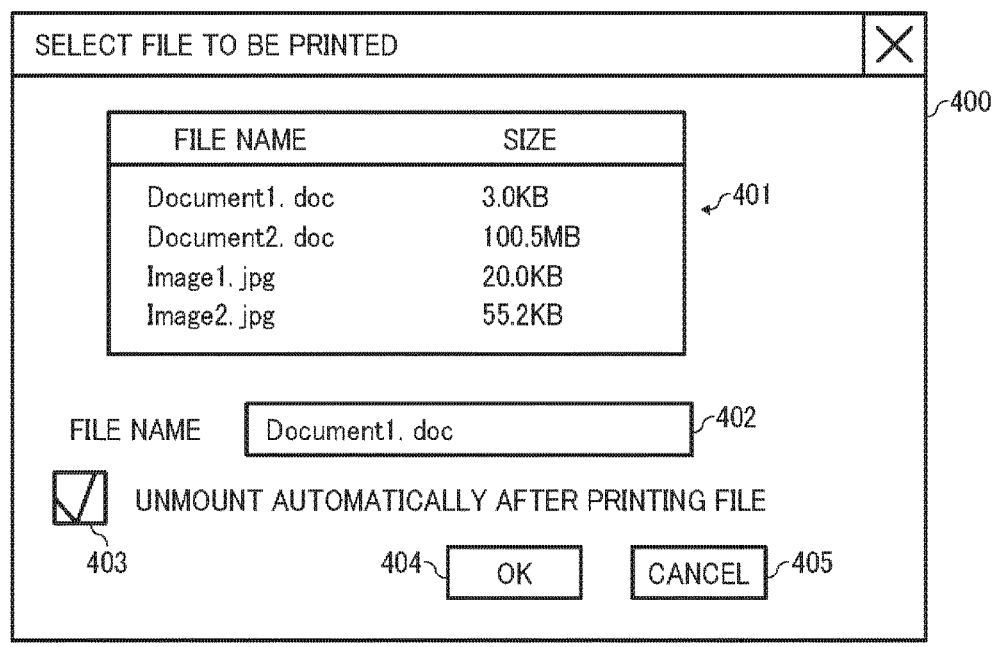
FIG. 10 is a diagram illustrating a print request screen as an embodiment of the present invention.

The print request screen 400 in FIG. 10 is a screen for accepting a request to print a file by user operation, and the print request screen 400 includes a file list field 401, a specified file display field 402, an automatic unmount setting field 403, an OK button 404, and a cancel button 405.

Among them, the file list field 401 displays the list created in S31 in FIG. 9. The file list field 401 displays a file whose second mount status is "mounted", i.e., located in the mount point whose information is presented to the user as "mounted" as a candidate to be printed. As a result, it is possible to provide the storage area whose second mount status is "mounted" as the available storage area to the user. In this case, the information provided to the user is the list of files. However, a case that provides a mountable or unmountable storage area itself as a choice can be processed in the same way with reference to FIG. 11. In displaying the file list field 401, the command accepting unit 131 functions as a presenting unit.

Next, the specified file display field 402 displays a file specified as a target to be printed by user operation among the file list field 401.

The automatic unmount setting field 403 configures whether or not the storage area is unmounted automatically after starting printing requested this time using a check box. In this case, at least the storage area where the file to be printed is stored is unmounted. However, it is possible to unmount all mounted storage areas.

By pressing the OK button 404, an operation in accordance with the configuration set by the specified file display field 402 and the automatic unmount setting field 403 is requested to perform.

By pressing the cancel button 405, it is requested that the print request screen 400 be closed without doing anything to go back to the original screen.

Figure 11:
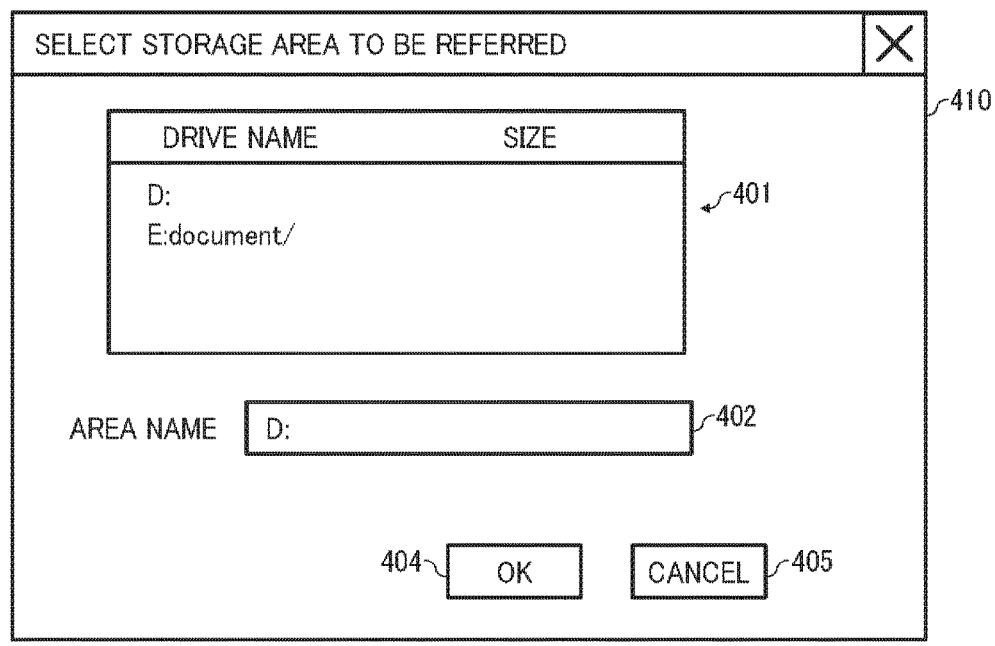
FIG. 11 is a diagram illustrating a storage area selection screen as an embodiment of the present invention.

FIG. 11 is a diagram illustrating a storage area selection screen for selecting a storage area to be referred in this embodiment.

The storage area selection screen 410 in FIG. 11 includes a storage area list field 411, a specified storage area display field 412, an OK button 414, and a cancel button 415.

The storage area list field 411 presents a list of paths of storage areas whose second mount status is "mounted", i.e., where the mount point whose information is presented to the user as "mounted" as available storage areas.

The specified storage area display field 412 displays a storage area specified as a target to be referred by user operation among the storage area list field 411.

By pressing the OK button 414, an operation in accordance with the configuration set by the specified storage area display field 412 is requested to perform. After the OK button 414 is pressed, in the image processing apparatus, a file stored in the specified storage area is moved to the print request screen 400 displayed in the file list field 401.

By pressing the cancel button 415, it is requested that the storage area selection screen 410 be closed without doing anything to go back to the original screen.

Back to FIG. 9, after performing the operation in S32, the image processing apparatus 100 updates a displayed screen appropriately in accordance with the operation accepted on the print request screen 400 and waits until the OK button 404 or the cancel button 405 is pressed in S33 and S34.

Figure 12:
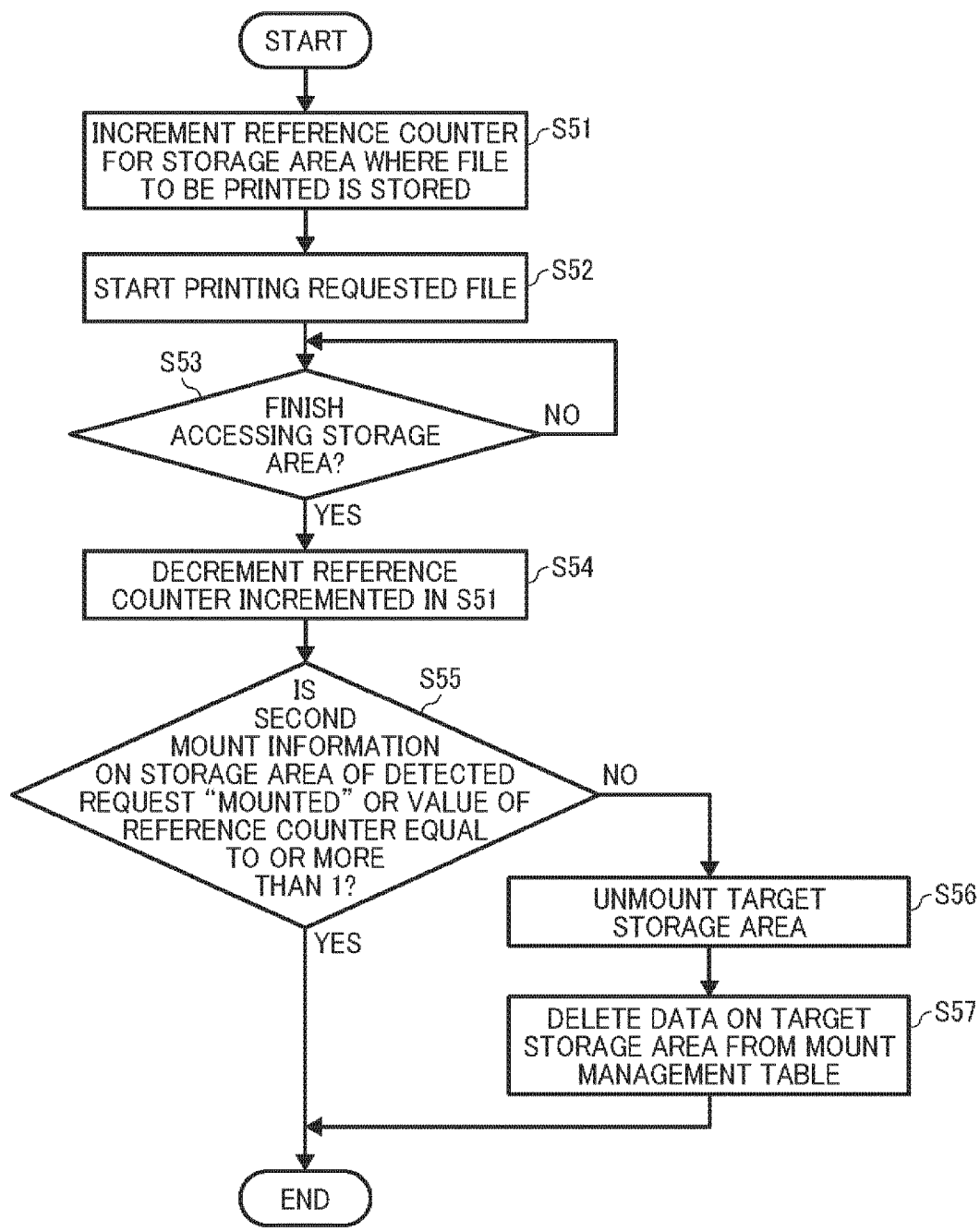
FIG. 12 is a flowchart illustrating an operation performed by the image processing apparatus in case of detecting a request to print a file stored in a mounted storage area as an embodiment of the present invention.

Subsequently, after the OK button is pressed (YES in S33), the image processing apparatus 100 generates a request to print the file selected as the target to be printed using the function of the operation request unit 135 in S35, and an operation in FIG. 12 is started by passing the request to the corresponding data referrer 140.

Figure 13:
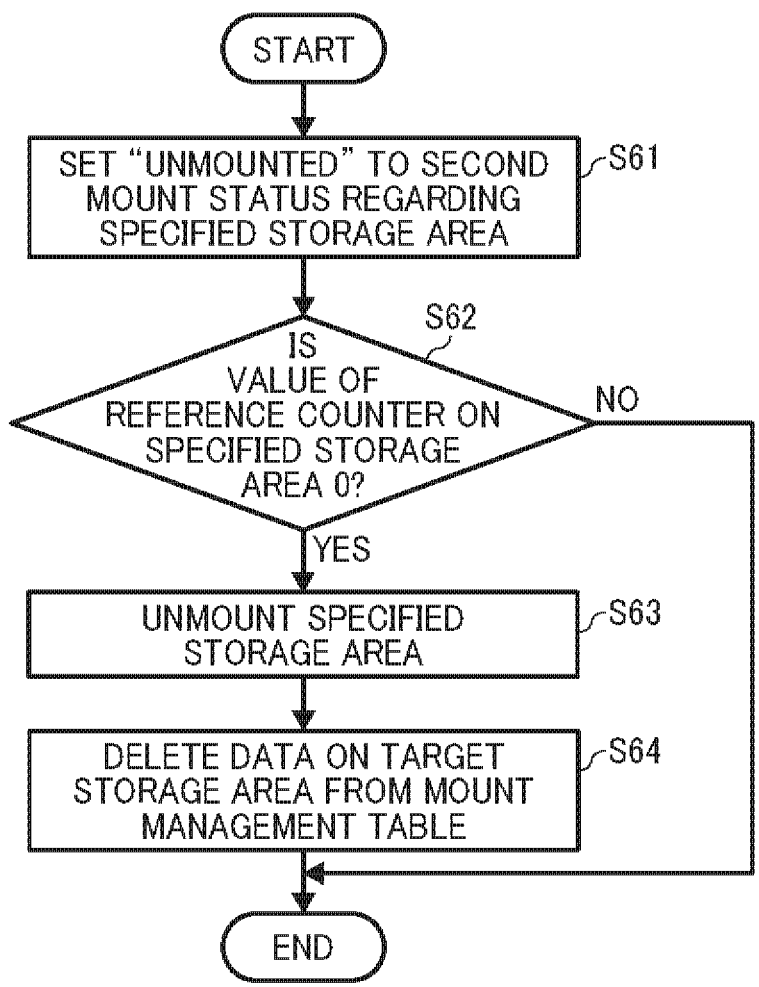
FIG. 13 is a flowchart illustrating an operation performed by the image processing apparatus in case of detecting a request for unmount as an embodiment of the present invention.

In this case, if it is configured to unmount automatically in the automatically unmount setting field (YES in S36), the image processing apparatus 100 generates a request to unmount using the function of the unmount request unit 134 in S37, and an operation in FIG. 13 is started by passing the request to the mount management unit 150. It should be noted that the request to unmount is generated after starting printing in accordance the request to print in S35. It is possible to generate the request to unmount under determination of the unmountability determination unit 136 when the operation request consent notification unit 145 reports to the UI controller 130 that the printing is started.

After that, the image processing apparatus 100 closes the print request screen in S38, and the process ends. If the cancel button is pressed (YES in S34), steps S35 to S37 are skipped, and the step proceeds to S38.

As described above, in the operation in FIG. 9, the CPU 101 functions as a request accepting unit. In addition, especially in S37, the CPU 101 functions as a request unit. In addition, the operations in steps S31 to S34 and S38 correspond to the function of the request accepting unit 131.

In the image processing apparatus 100, it is possible to accept a request to perform operations other than printing using an accepting screen corresponding to the operation in the same way.

FIG. 12 is a flowchart illustrating an operation in case of detecting a request to print a file stored in a mounted storage area in this embodiment.

After detecting a request to print a file stored in a mounted storage area using the function of the operation request receiver, the image processing apparatus 100 starts the operation shown in the flowchart in FIG. 12. The request is generated in S35 in FIG. 9.

In FIG. 12, first, in the image processing apparatus 100, the data reference start notification unit 143 and the reference counter management unit 153 increments a reference counter value regarding the storage area where the file to be printed in accordance with the request to print is stored in S51. Subsequently, the operation executor 142 starts printing the file requested to be printed in S52. More specifically, after reading the file requested to be printed by accessing the mounted storage area, its data is passed to the print engine 106 to instruct the print engine 106 to print out the data.

After that, the image processing apparatus 100 waits until it is finished to access the storage area in accordance with printing in S53. Subsequently, after finishing the access, the data reference finish notification unit 144 and the reference counter management unit 153 decrements the reference counter value regarding the storage area where the printed file is stored in S54.

Next, in the image processing apparatus 100, the unmount need determination unit 155 refers to the mount information table to determine whether or not it is possible to unmount the storage area where the printed file is stored. The judgmental standard is that the storage area is not unmounted if the second mount information is "mounted" or the reference counter value is equal to or more than 1 and the storage area is unmounted if the second mount information is "unmounted" and the reference counter value is equal to 0 in S55.

If the second mount information is "mounted", it is presented to the user that the storage is mounted. Therefore, the image processing apparatus 100 determines that it is inappropriate to unmount the storage area without user permission considering it is finished to use as a trigger. In addition, if the reference counter value is equal to or more than 1, it is considered that another process other than the data referrer 140 that finishes referring this time is referring to the storage area. Therefore, the image processing apparatus 100 determines that it is inappropriate to unmount the storage area at this point. If those conditions are not satisfied, there is no particular problem to unmount the storage area. Therefore, the image processing apparatus 100 determines to unmount the storage area immediately since it could be a problem to maintain the mounting status unnecessarily due to a security requirement.

As a result, in case of YES in S55, the image processing apparatus 100 determines not to unmount the storage area, and the operation in FIG. 12 ends as is. By contrast, in case of NO in S55, it is determined to unmount the storage area. Subsequently, the unmount executor 157 and the unmount processor 162 unmount the storage area in S56. After that, the mount status management unit 152 deletes the data on the target storage area from the mount management table in S57, and the operation in FIG. 12 ends.

As described above, the CPU 101 functions as an unmount controlling unit (an unmount controller) in the operation in steps S55 to S57 in FIG. 12.

The image processing apparatus 100 can perform operations other than printing in accordance with the detected request for operation in the same way. In addition, in performing those operations, it is possible to determine whether or not to unmount a storage area in the same way.

FIG. 13 is a flowchart illustrating an operation in case of detecting a request to unmount a storage area in this embodiment.

In the image processing apparatus 100, after the request receiver 151 that functions as an unmount request accepting unit detects a request to unmount a storage area specifying the storage area, the operation shown in the flowchart in FIG. 13 starts. The request is generated in S37 in FIG. 9. In other cases, the unmount request unit 134 generates the request in accordance with a request to unmount by user operation accepted by the command accepting unit 131. In case of detecting a request to unmount specifying multiple storage areas, the image processing apparatus 100 performs the operation in FIG. 13 for each of the specified storage areas.

In the operation in FIG. 13, first, in the image processing apparatus 100, the mount status management unit 152 sets the second mount status of the storage area specified in the request to unmount to "unmounted" in S61. As a result, instead of unmounting the storage area by the OS 160 actually, the image processing apparatus 100 presents that the target storage area is unmounted to the user. Therefore, since a request for an operation from the user is accepted assuming that the storage area is unavailable, it is not required to present or acquire data stored in the storage area.

On the other hand, since the OS 160 is not instructed to unmount at this point, processes such as the data referrer 140 etc. can use the target storage area. Consequently, a printing process etc. performing currently can be executed as is. That is, it is possible to configure the second mount status immediately in accordance with the request to unmount without checking whether or not other processes are using the target storage area even if a process is using the storage area and it is impossible to unmount the storage area at the moment. In addition, it is possible to present to the user that the target storage is unmounted.

Next, in the image processing apparatus 100, the unmount need determination unit 155 refers to the mount information table to determine whether or not it is possible to unmount the specified storage area. In this case, it is determined that it is possible to unmount the storage area if the reference counter value of the specified storage area is 0 in S62. That is because it is considered that no process is referring to the storage area and there is no problem with the operation of the apparatus if the storage area is unmounted.

Therefore, in case of YES in S62, in the image processing apparatus 100, the unmount executor 157 and the unmount processor 162 unmount the storage area in S63. After that, the mount status management unit 152 deletes the data on the target storage area from the mount management table in S64, and the operation in FIG. 13 ends.

In case of NO in S62, the unmounting operation is not performed at this point, steps S63 and S64 are skipped, and the process ends.

As described above, in the operation in step S61 in FIG. 13, the CPU 101 functions as a mount status updating unit. In addition, in steps S63 and S64, the CPU 101 functions as an executor.

Next, along with the operations in FIGS. 8 to 13, sequential operations of units in the image processing apparatus 100 are described below with reference to sequence charts. In sequence charts in FIGS. 14 to 17, operations in units of functional units shown in FIG. 3 are illustrated, and operations in units of more detailed functional units shown in FIGS. 4 to 6 are described as needed.

Figure 14:
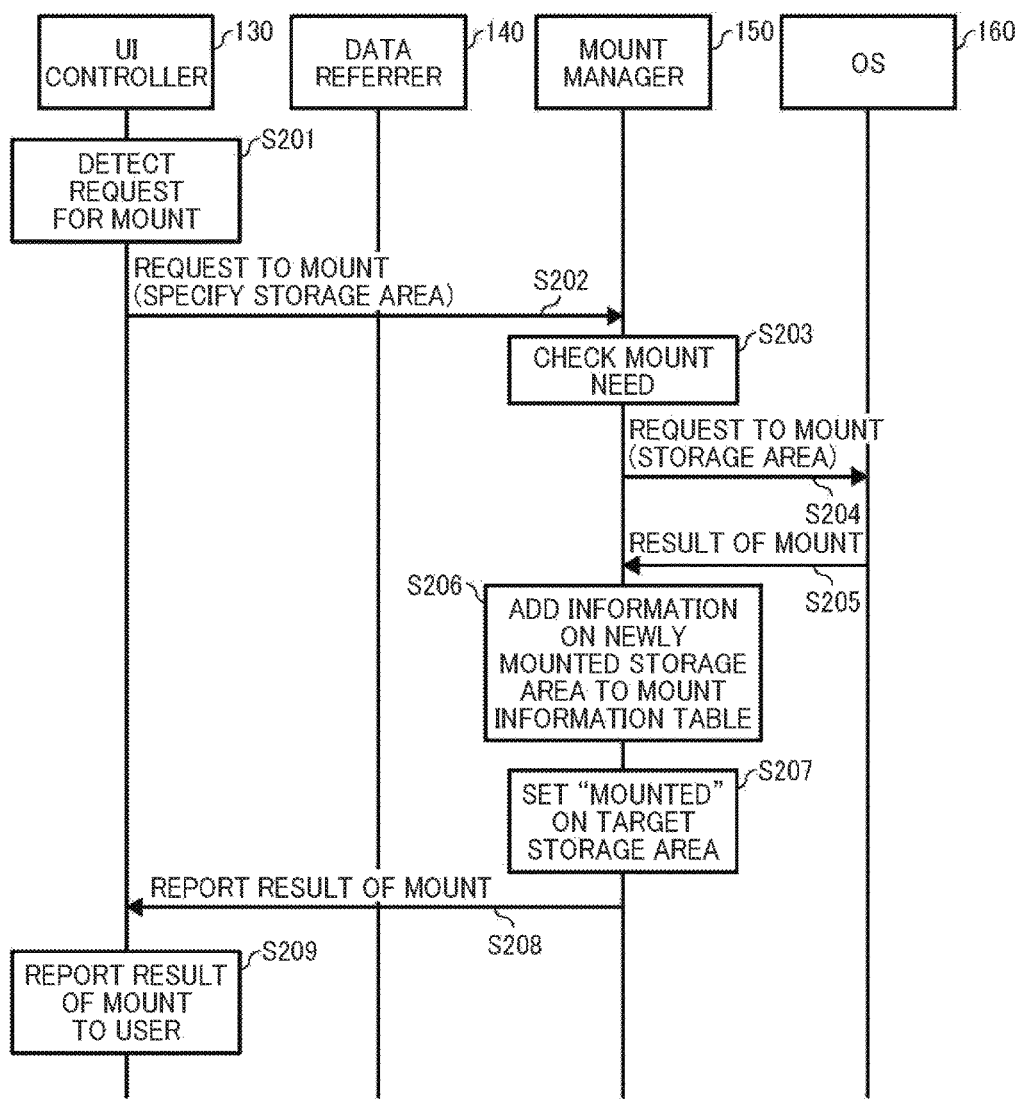
FIG. 14 is a sequence diagram illustrating a first example performed by the image processing apparatus as an embodiment of the present invention.
Figure 15:
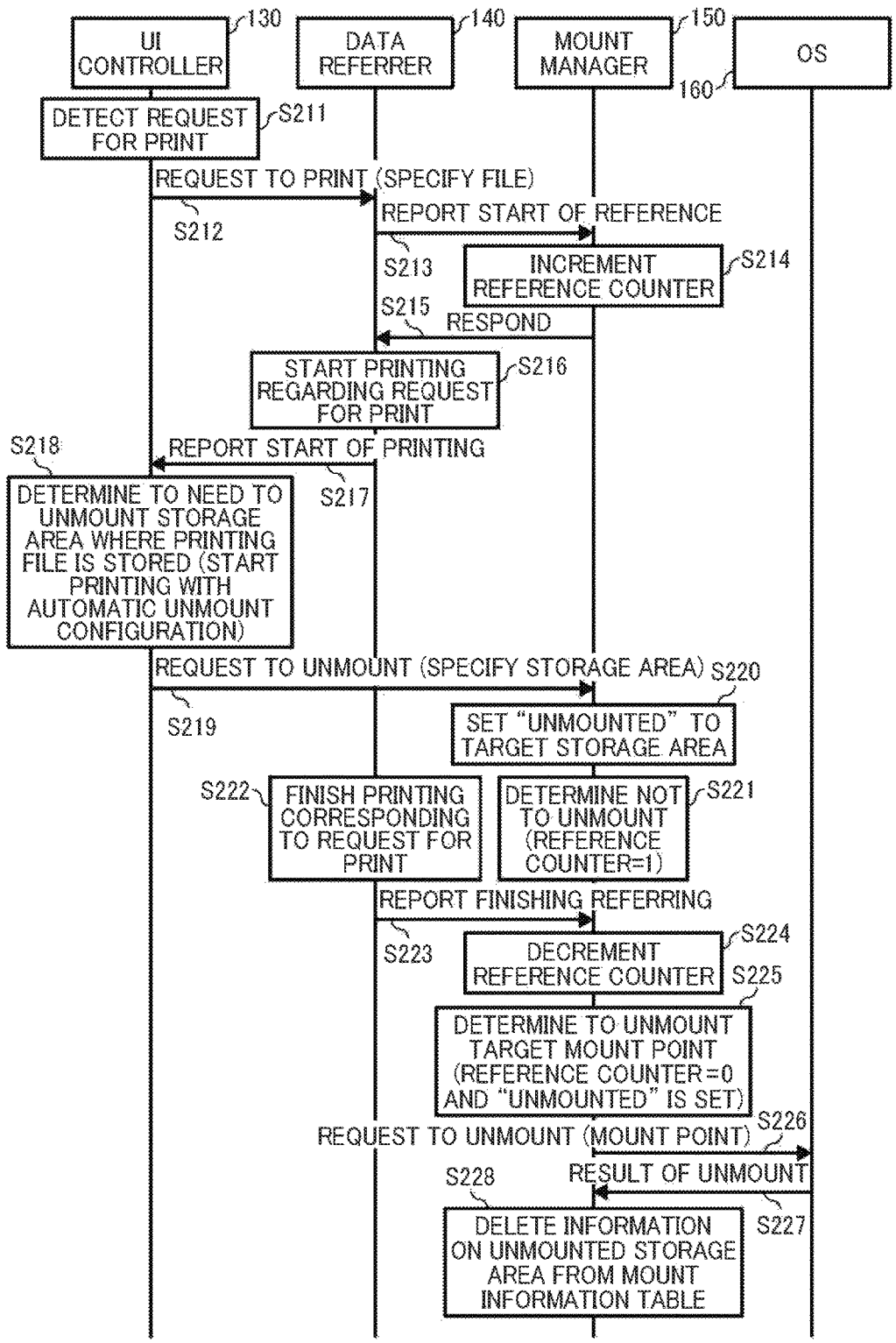
FIG. 15 is a sequence diagram illustrating the operation continued from FIG. 14.

First, a first example is illustrated in FIGS. 14 and 15. In this case, the image processing apparatus 100 is requested to print a file stored in an external storage device by user operation, and the external storage is not mounted. It is also assumed that no authentication is required to mount the external storage and it is possible to configure unmounting automatically in the print request screen 400 in FIG. 10.

In the first example, first, the external storage device that stores a file to be printed is connected to the image processing apparatus 100, and the image processing apparatus 100 is requested to mount the external storage device by user operation. In the image processing apparatus 100, the command accepting unit 131 in the UI controller 130 detects this request in S201. Subsequently, after the command accepting unit 131 passes this request to the mount request unit 133, the mount request unit 133 passes a request to mount specifying the external storage device as the storage area to the mount management unit 150 in S202.

In the mount management unit 150, the command receiver 151 receives the request to mount and reports to the mount need determination unit 154 about that. Since the specified external storage device is not registered in the mount information table (i.e., the first mount status is "unmounted"), the mount need determination unit 154 determines that it is necessary to perform the mounting operation in accordance with the request to mount in S203.

Subsequently, after the mount need determination unit 154 reports to the mount executor 156 about that, and the mount executor 156 requests the OS 160 to perform the mounting operation in S204. In the OS 160, the mount processor 161 performs the mounting operation in accordance with the request to mount, and the external storage device is mounted. After that, the OS 160 returns the result of mounting to the mount executor 156 in S205.

After receiving the result of mounting, the mount executor 156 reports to the mount status management unit 152 that it is finished to perform the mounting operation. The mount status management unit 152 adds data on the external storage device as the newly mounted storage area to the mount information table in S206. In addition, the second mount information of the target storage area is set to "mounted" in S207.

After that, the mount executor 156 reports to the mount request unit 133 in the UI controller 130 about the result of mounting in accordance with the request to mount in S202 (i.e., mounting succeeded) in S208. The mount request unit 133 reports to the command accepting unit 131 about that, and the command accepting unit 131 displays the result of mounting on the screen to report that to the user in S209.

After browsing the result of mounting, next, it is requested to display the print request screen 400 in FIG. 10 by user operation. Subsequently, it is requested to print specifying the file stored in the mounted external storage device by user operation on that screen. In this case, it is also configured to perform the unmounting operation automatically.

In the image processing apparatus 100, in the operation in FIG. 15, the command accepting unit 131 in the UI controller 130 detects this request in S211. Subsequently, the command accepting unit 131 passes the request to the operation request unit 135, and the operation request unit 135 passes a request to print specifying the file to the data referrer 140 that is in charge of printing in S212.

In the data referrer 140, the operation request receiver 141 receives the request to print and passes the request to print to the data reference start notification unit 143. After that, the data reference start notification unit 143 transfers a notification of starting reference including information on a mount point referred to in printing to the mount management unit 150 in S213.

In the mount management unit 150, after the request receiver 151 receives the notification of starting reference, the reference counter management unit 153 is instructed to increment the reference counter value of the mount point indicated by the notification of starting reference in S214. Subsequently, a response is transferred to the data reference start notification unit 143 in the data referrer 140 in S215.

After receiving the response, in S216, the data reference start notification unit 143 report to the operation executor 142 that it is possible to access the mounted external storage device and instructs the operation executor 142 to start printing in accordance with the request to print accepted in S212. In addition, the data reference start notification unit 143 reports to the operation request consent notification unit 145 that it is started to print and instructs the operation request consent notification unit 145 to report the operation request unit 135 in the UI controller 130 that it is started to print in S217.

The operation request unit 135 passes this notification to the unmountability determination unit 136. Based on the notification, the unmountability determination unit 136 determines that it is required to unmount the storage area that stores the file that is started printing since it is started to print in accordance the print request with configuration of "unmounted automatically" in S218. "Unmount" in S218 indicates unmount from viewpoint of the user, and it is possible to achieve that by changing the second mount status into "unmounted" at least.

After the determination in S218, the unmountability determination unit 136 notifies the unmount request unit 134 of that determination. After receiving the notification, the unmount request unit 134 passes a request to unmount specifying the storage area that stores the file that is started printing to the mount management unit 150 in S219.

In the mount management unit 150, the request receiver 151 receives the request to unmount and passes the request to the mount status management unit 152 to instruct to set the second mount status for the specified storage area to "unmounted" in S220. In addition, considering that the second mount status is set to "unmounted" as a trigger, the mount status management unit 152 instructs the unmount need determination unit 155 to determine whether or not it is possible to unmount the specified storage.

As a result, since the reference counter value for the specified storage area is 1 after being incremented in S214, the unmount need determination unit 155 determines that it is unnecessary to unmount the storage area in accordance with the standard in S55 in FIG. 12 in S221. As described above, the operation in accordance with the request to unmount in S219 ends. It is possible that the mount status management unit 152 returns the processing result to the UI controller 130.

On the other hand, after finishing the printing operation started in S216 in S222, the operation executor 142 in the data referrer 140 notifies the data reference finish notification unit of that. Subsequently, after receiving the notification, the data reference finish notification unit 144 transfers a notification of finishing referring including the information on the mount point referred in printing to the mount management unit 150 in S223.

In the mount management unit 150, the request receiver 151 receives the notification of finishing referring and instructs the reference counter management unit 153 to decrement the reference counter value for the mount point indicated by the notification of finishing referring in S224. As a result, the reference counter value returns to the initial value, i.e., 0.

In addition, considering that the reference counter value is decremented as a trigger, the reference counter management unit 153 instructs the unmount need determination unit 155 to determine whether or not it is required to unmount the storage area that is finished referring.

As a result, since the second mount status of the target storage area is "unmounted" configured in S220 and the reference counter value is 0 as described above, the unmount need determination unit 155 determines to perform the unmount operation in accordance with the standard in S55 in FIG. 12 in S225.

Next, the unmount need determination unit 155 notifies the unmount executor 157 of that, and the unmount executor 157 requests the OS 160 to perform the unmounting operation in S226. In the OS 160, the unmount processor 162 performs the unmounting operation in accordance with the request. As a result, the external storage device gets unmounted. Subsequently, the OS 160 returns the unmounting result to the unmount executor 157 in S227.

In response to that, the unmount executor 157 reports to the mount status management unit 152 that it is finished to unmount. As a result, the mount status management unit 152 deletes data on the external storage device as the unmounted storage area from the mount information table in S228. As described above, the operation in accordance with the notification of finishing referring to the file in S223 ends. It is possible that the mount status management unit 152 returns the processing result to the data referrer 140. Otherwise, it is possible that the operation executor 142 in the data referrer 140 returns the result of printing to the UI controller 130.

The first example is described above.

As described above, in the image processing apparatus 100, the mount status management unit 152 manages the first mount status that indicates whether a storage area is mounted or not in accordance with the mounting operation and the unmounting operation in the OS 160 and the second mount status that indicates whether a storage area is mounted or not to be presented to the user respectively.

Consequently, after finishing the operation such as selecting a file to be printed that the user needs to refer to a content of a storage area, while the process that executes printing can refer to the storage area, it is possible to present as if the target storage area is unmounted to the user. As a result, it is possible to shorten time that the user recognizes that the storage area is mounted. Consequently, for example, even if a user leaves an apparatus during printing after requesting to mount a storage area and print a file stored in the storage area, it is possible to prevent other users from accessing the storage area while the user is away from the apparatus.

In this case, if it is assumed that it is impossible to unmount during printing, other users can access the mounted storage area by operating the image processing apparatus 100. However, even during printing, the image processing apparatus 100 can present as if the storage area is unmounted to the user.

More specifically, for example, in S219 in FIG. 15 (corresponding to S61 in FIG. 13 started in S37 in FIG. 9), even if it is performed printing and it is impossible to perform the unmounting operation immediately, it is possible to achieve the effect described above by configuring the second mount status to "unmounted".

In addition, other than that, it is possible to accept a request to perform the unmounting operation manually by user operation. Even in case of the manual configuration, it is possible to configure the second mount status to "unmounted" even during printing just like the case described above.

In case of repeating the request to print etc., it is considered that it is more user-friendly to request to unmount manually after finishing processing all necessary requests compared to requesting to unmount automatically each time the user requests.

However, just like S219 in FIG. 15, if the image processing apparatus 100 receives a request for an operation such as printing and it is possible to request to unmount automatically when the image processing apparatus 100 starts the operation in accordance with the request, it is possible to prevent from forgetting to unmount, enhancing security.

In addition, after decrementing in S54 in FIG. 12, if it is detected that the number of process that uses a storage area currently becomes 0, it is possible to unmount the storage area. Consequently, after finishing using the storage area, it is possible to unmount the storage area automatically and immediately.

In addition, furthermore, by adding a condition that the second mount status is "unmounted", since it is possible to prevent from unmounting a storage area while a user refers to the storage area, it is more preferable.

Figure 16:
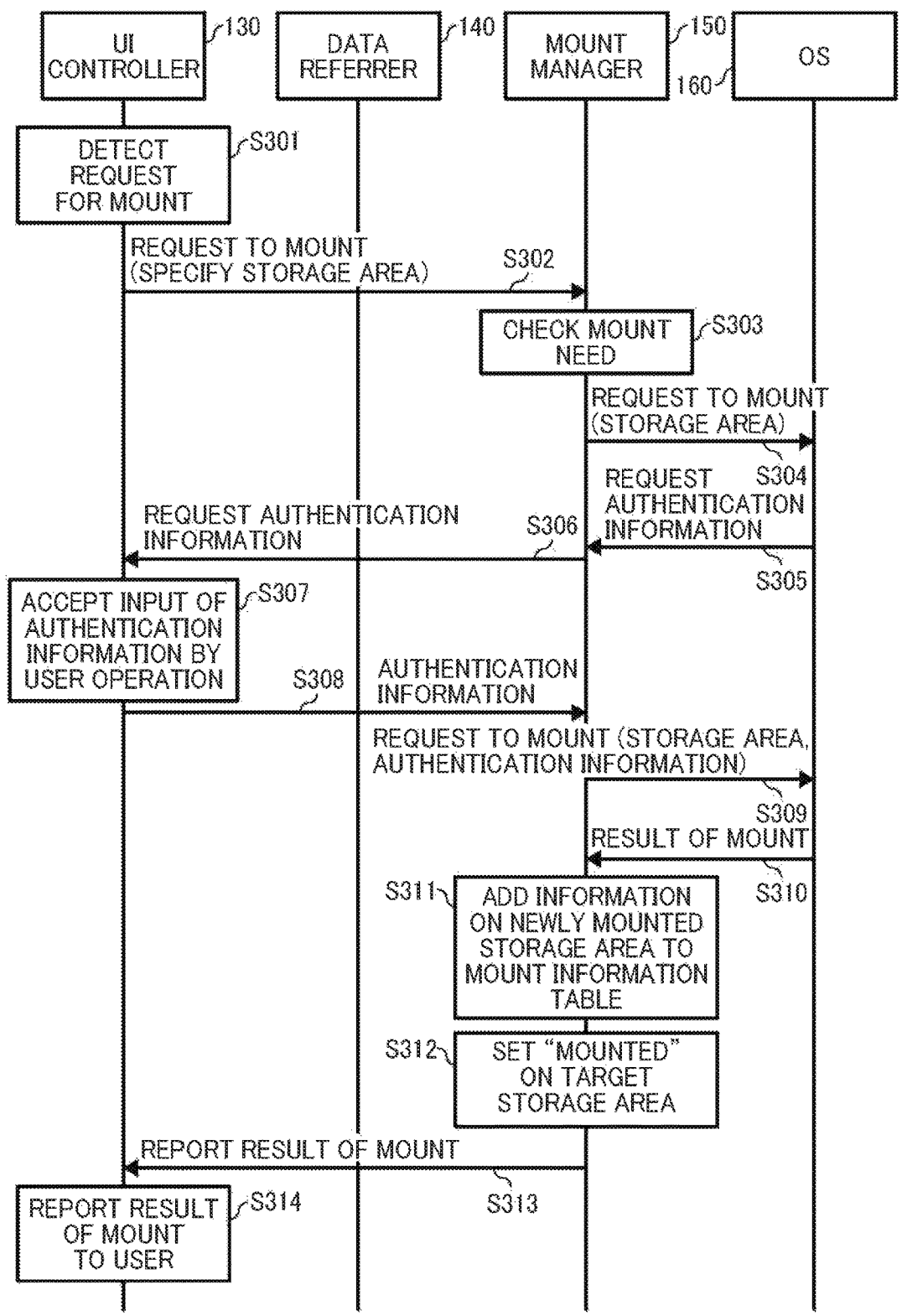
FIG. 16 is a sequence diagram illustrating a second operation performed by the image processing apparatus as an embodiment of the present invention.
Figure 17:
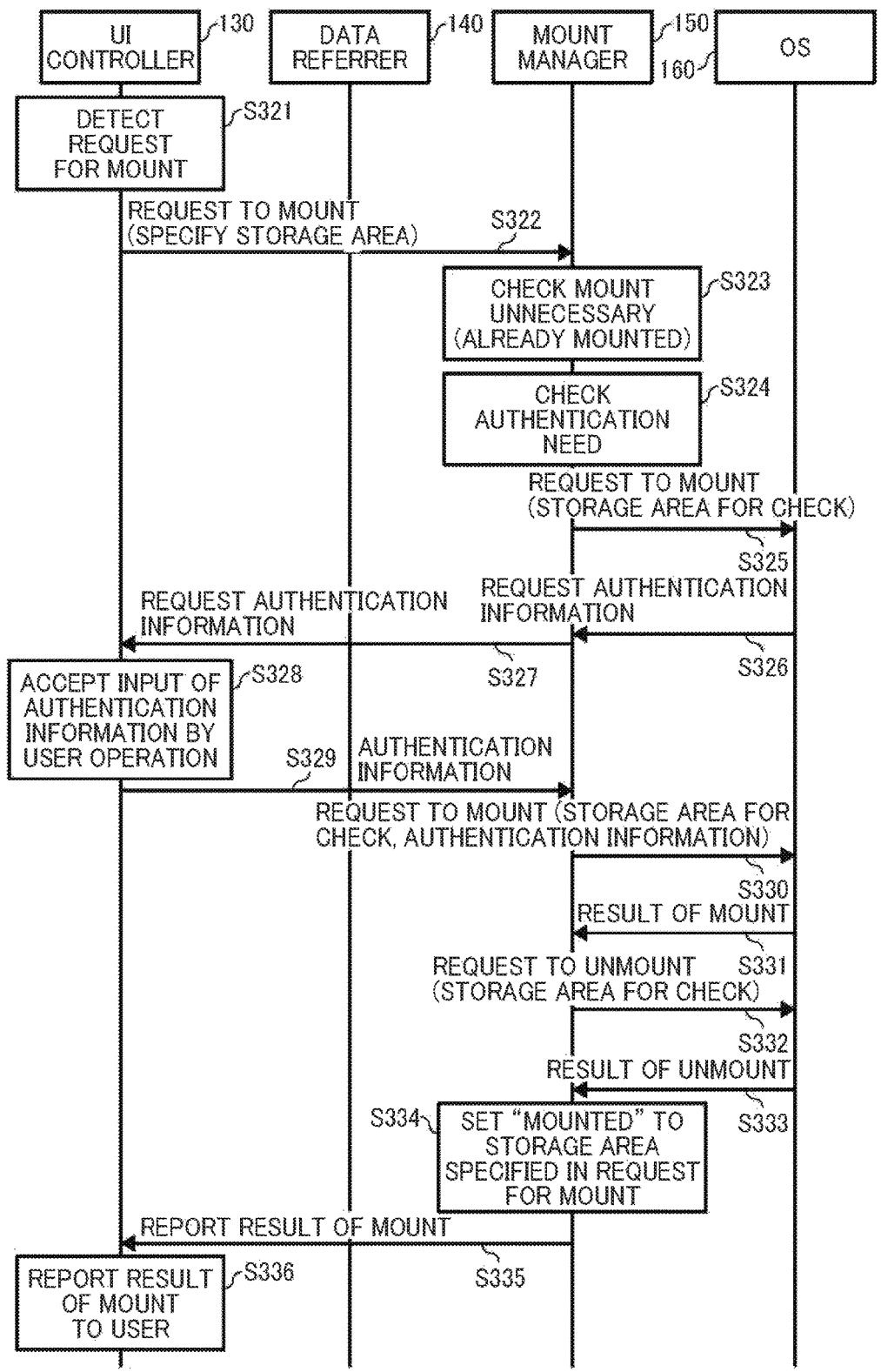
FIG. 17 is a sequence diagram illustrating an operation continued from FIG. 16.

Next, a second example is illustrated in FIGS. 16 and 17. The second example is different from the first example in a point that authentication is required in mounting an external storage device.

In the second example, operations in steps S301 to S304 are the same as the first example. However, after accepting a request to mount in S304, since it is required to authenticate in mounting, the mount processor 161 in the OS 160 requests the mount executor 156 as the requester to pass authentication information used for the authentication in S305. After receiving the request, the mount executor 156 requests the command accepting unit 131 in the UI controller 130 to pass the authentication information in S306.

After receiving the request, the command accepting unit 131 displays an appropriate screen on the UI 104 to accept the authentication information input by user operation in S307. It is possible to have the user to input data stored in an IC card or biometric information as the authentication information.

Next, the command accepting unit 131 passes the authentication information accepted from the user to the mount executor 156 in S308. After receiving the authentication information, the mount executor 156 requests the OS 160 to mount again adding the authentication information.

If the mount executor 161 succeeds the user authentication using the authentication information and there is no other problem, it is succeeded to mount. Subsequent operations in S310 to S314 are the same as the operations in S205 to S209 in FIG. 14. However, since it is required to perform the authentication in S305, in the mount information table, information indicating that it is required to authenticate in mounting an external storage is registered.

In addition, in the condition of the second example, after S314, it is possible that the image processing apparatus 100 performs the same operations described above with reference to FIG. 15. Regarding the unmounting operation, it is unnecessary to perform the authentication in unmounting.

FIG. 17 is a sequence diagram illustrating an operation that the command accepting unit 131 detects a second request to mount the same external storage device after S220 in FIG. 15.

After detecting the request in S321, after the command accepting unit 131 passes this request to the mount request unit 133, the mount request unit 133 passes the request to mount specifying the external storage device as the storage area to the mount management unit 150 in S322.

In the mount management unit 150, the mount need determination unit 154 receives the request via the request receiver. Subsequently, since the specified external storage device is registered in the mount information table in S311 (i.e., the first mount status is "mounted"), it is determined that it is unnecessary to mount in accordance with the request to mount in S323.

In addition, the mount need determination unit 154 determines that it is required to authenticate in mounting the external storage device from the content of the mount information table in S324. As a result, the mount need determination unit 154 determines that it is required to instruct the OS 160 to execute the mounting operation for this authentication.

Subsequently, after the mount need determination unit 154 reports to the mount executor 156 about that, and the mount executor 156 requests the OS 160 to perform the mounting operation in S325. The storage area specified in this case is a predetermined storage area for checking the authentication information. Subsequently, in steps S326 to S331, each unit performs the mounting operation including the authenticating operation just like the case in steps S305 to S310 in FIG. 16.

After that, the mount executor 156 instructs the unmount executor 157 to request the OS 160 to unmount the storage area for checking mounted previously in S332. That is because the storage area cannot be used for checking in the next mounting operation and that can be a risk of security if the storage area for checking is kept mounted. In response to the request, the unmount processor 162 in the OS 160 performs the unmounting operation and returns its result in S333.

After the mount executor 156 receives the result via the unmount executor 157, it is possible to present the external storage device as mounted one to the user. Therefore, the mount status management unit 152 is instructed to change the second mount status of the external storage device into "mounted" in S334.

After that, the mount executor 156 reports to the mount request unit 133 in the UI controller 130 about the result of mounting in accordance with the request to mount in S322 (i.e., mounting succeeded) in S335. The mount request unit 133 reports to the command accepting unit 131 about that, and the command accepting unit 131 displays the result of mounting on the screen to report that to the user in S336.

The second example is described above.

In the second example, the request to mount on the storage area whose first mount status is "mounted" and the second mount status is "unmounted" is issued. Since it is presented to the user as if the storage area is not mounted, it is possible to request to mount the storage area by user operation.

In this case, since the OS 160 recognizes that the storage area is mounted, it is unnecessary to mount the storage area again actually. Therefore, since it is possible to present to the user as if the mounting operation is finished simply by changing the second mount information, it is possible to omit the mounting operation, reducing processing load and processing time.

In addition, if the authentication is required, just like steps S325 to S331, the OS 160 performs the mounting operation on the predetermined storage area for the authentication check, and it is possible to handle as if the storage area specified in the request to mount succeeds in mounting if the mounting operation succeeded.

As described above, it is possible to perform the new mounting operation substantively without any effect on operations of the target storage area.

In case of performing the mounting operation anyway, in case of YES in S17 in FIG. 8, it is possible to mount the storage area that has already been mount to the mount point at different directory path separately. For example, if the directory path of the mount point is determined using time information when the mounting operation is performed etc., it is possible to make the directory path a unique one. As a result, in case of performing the mounting operation newly, it is possible to mount the storage area redundantly without affecting operations of the storage area that has been already mounted.

In case of NO in S17 (i.e., in case of YES in S12), the new mounting operation described above is not always prevented from performing.

In the embodiment described above, the specific configuration of the apparatuses, the specific sequence of the processes, the data configuration etc. are not limited to the above description.

For example, in the embodiments described above, the image processing apparatus 100 accepts user requests and user operations performed on the image processing apparatus 100 itself directly. Otherwise, it is possible to accept those user requests and user operations using an external information processing apparatus such as the terminal apparatus 300 etc.

Figure 18:
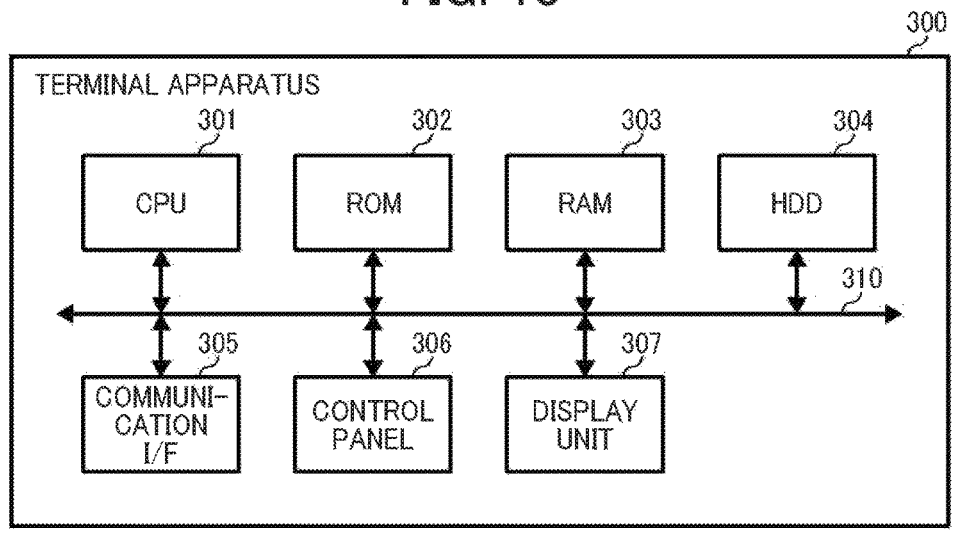
FIG. 18 is a diagram illustrating a hardware configuration of a terminal apparatus as an embodiment of the present invention.

In this case, a known computer that includes a CPU 301, a ROM 302, a RAM 303, a HDD 304, a communication I/F 305, a control panel 306, and a display unit 307 etc. connecting with each other via a system bus 310 as shown in FIG. 18 can be used as the terminal apparatus 300.

Figure 19:
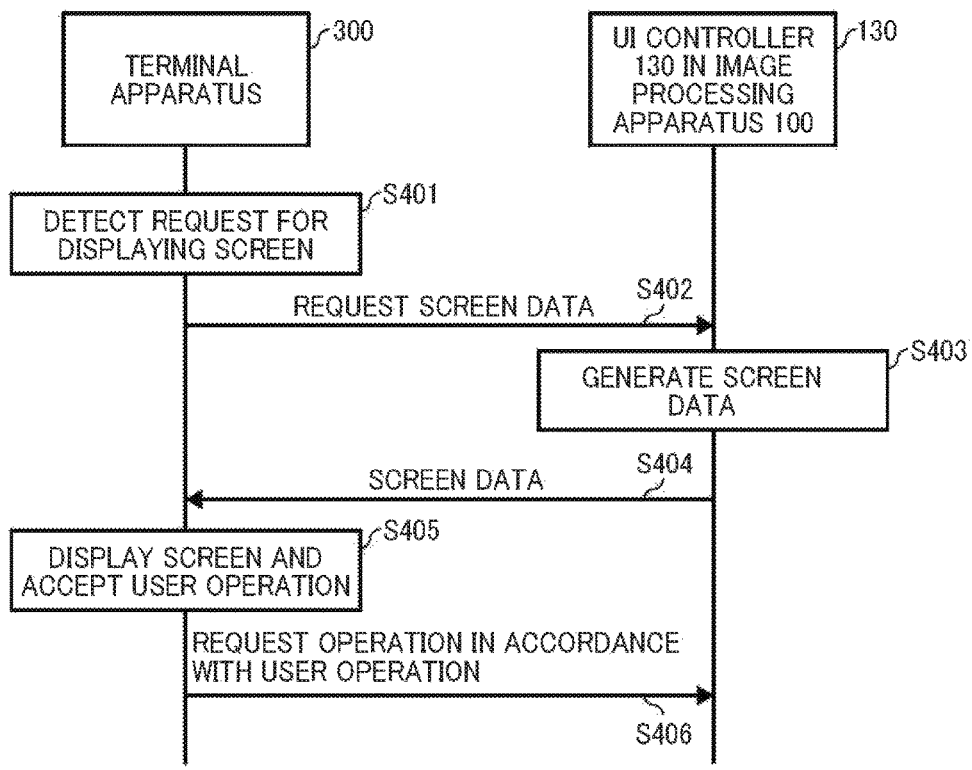
FIG. 19 is a sequence diagram illustrating an operation that the terminal apparatus accepts a request to the image processing apparatus by user operation to operate the image processing apparatus as an embodiment of the present invention.

In addition, as shown in FIG. 19, in case of detecting a request to display a screen by user operation in S401, the terminal apparatus 300 accesses the UI controller 130 in the image processing apparatus 100 to acquire screen data in accordance with the request in steps S402 to S404. Subsequently, in the terminal apparatus 300, the display unit 307 displays a screen corresponding to the screen data, user operations to the image processing apparatus 100 are accepted on the screen, and a request for operation in accordance with the accepted user operation is transferred to the image processing apparatus 100 in S406.

The image processing apparatus 100 can handle the requests for operation just like various user requests accepted in the embodiments described above, and it is possible to perform the operations just like the operations shown in FIGS. 8 to 13.

It is also possible that a request for operation accepted by the image processing apparatus 100 is not only a request arising from user operation but also a request generated by a computer automatically.

In addition, aside from the embodiments described above, functions of the image processing apparatus 100 can be implemented distributing to multiple apparatuses, and it is possible to construct an information processing system or an image processing system that includes functions similar to the image processing apparatus 100 cooperating those multiple apparatuses with each other.

In the embodiments described above, the information processing apparatus is constructed as the image processing apparatus 100. However, in the present invention, the image processing function is not mandatory. Therefore, it is possible to construct a configuration that a generic computer includes function shown in FIGS. 3 to 6.

Programs in the embodiments of the present invention instructs the computer to control the predetermined hardware to implement the functions of the image processing apparatus 100 described in the embodiments.

It is possible to store these programs in the ROM or other nonvolatile storage media (e.g., flash memory and EEPROM etc.) included in the computer from the beginning. However, it is possible to provide those programs by storing those programs in any nonvolatile storage medium such as a memory card, CD, DVD, and Blu-ray disc to distribute those programs. By installing those programs stored in those recording media in the computer and executing those programs, it is possible to implement the operations described above.

Furthermore, it is also possible to download those programs from an external apparatus that includes the recording medium storing those programs or an external apparatus that stores those programs in a storage unit and install those programs in the computer to execute those programs.

In addition, configurations described in the above embodiments can be combined arbitrarily and implemented as long as they do not contradict with each other of course.

The present invention also encompasses a non-transitory recording medium storing a program that executes an information processing method performed by an information processing apparatus. The information processing method includes the steps of controlling mounting or unmounting of a specified storage area to an operating system of the information processing apparatus, storing, in a memory, a first mount status indicating whether or not mounting or unmounting operation is performed to the operating system of the information processing apparatus, and a second mount status indicating whether or not the specified storage area is mounted, and presenting the specified storage area as an available mounted storage area to a user if the second mount status indicates that the mounted storage area is mounted.

In the above-described example embodiment, a computer can be used with a computer-readable program, described by object-oriented programming languages such as C++, C#, Java (registered trademark), or legacy programming languages such as machine language, assembler language, C language to control functional units used for the apparatus or system. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), Blu-ray disc, electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these. A part of the functions of the described embodiments or all functions of the described embodiments may be implemented by one or more processing circuits. A processing circuit includes a programmed processor, as a processor includes circuitry. A processing circuit includes a programmable device (PD) such as a Field Programmable Gate Array (FPGA) for example. A processing circuit also includes devices such as an application specific integrated circuit (ASIC) and conventional circuit components arranged to perform the recited functions. It is also possible to distribute them storing a recording medium as data described in circuit configuration data (bit stream data) downloaded to the PD to implement the functional blocks on the PD, Hardware Description Language (HDL) for generating the circuit configuration data, Very High speed integrated circuits hardware Description Language (VHDL), and Verilog-HDL etc.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. An information processing apparatus, comprising:
   circuitry to control mounting or unmounting of a specified storage area to an operating system on the information processing apparatus; and
   a memory to store a first mount status indicating whether the specified storage area is to be mounted or unmounted, and to store a second mount status indicating whether the specified storage area is to be presented to a user or not;
   the circuitry configured to control the specified storage area to not be presented on a display when the first mount status stored in the memory indicates that the specified storage area is to be mounted and the second mount status stored in the memory indicates that the specified storage area is not to be presented to the user.

2. The information processing apparatus according to claim 1, wherein the circuitry is further configured to:
   receive, along with a request to print a file in the specified storage area, an instruction to automatically unmount the specified storage area after completion of printing the file.

3. The information processing apparatus according to claim 2, wherein the instruction to automatically unmount is received by user operation.

4. The information processing apparatus according to claim 1, wherein the circuitry is configured to:
   count a number of processes each using the specified storage area; and
   unmount the specified storage area if the counted number of processes using the specified storage area becomes zero.

5. The information processing apparatus according to claim 4, wherein the circuitry is configured, in response to determining that the counted number of processes using the specified storage area becomes zero and further that the second mount status indicates to present the specified storage area to the user as being unmounted, to set the first mount status to indicate that the specified storage area is to be unmounted, and to unmount the specified storage area after completion of printing of a file in the specified storage area.

6. The information processing apparatus according to claim 1, wherein the circuitry is configured to:
   accept a request to mount the specified storage area; and
   set the second mount status to present to the user that the specified storage area is mounted instead of mounting the specified storage area redundantly if the first mount status indicates that the specified storage area is mounted.

7. The information processing apparatus according to claim 6, wherein the circuitry authenticates the user for accessing the specified storage area in response to receiving the request to mount, and sets the second mount status of the specified storage area to indicate the specified storage area is to be presented to a user as being mounted in case of succeeding in mounting the specified storage area.

8. The information processing apparatus according to claim 1, wherein the circuitry receives a request to print a file in the specified storage area, sets the first mount status to mounted to enable the operating system to access the specified storage area during printing of the file, initiates the printing of the file, and sets the second mount status to present to the user that the specified storage area is unmounted prior to completion of the printing of the file.

9. An information processing method, performed by an information processing apparatus, the method comprising:
   controlling mounting or unmounting of a specified storage area to an operating system of the information processing apparatus;
   storing, in a memory, a first mount status indicating whether the specified storage area is to be mounted or unmounted, and a second mount status indicating whether the specified storage area is to be presented to a user or not; and
   controlling the specified storage area to not be presented on a display when the first mount status stored in the memory indicates that the specified storage area is to be mounted and the second mount status stored in the memory indicates that the specified storage area is not to be presented to the user.

10. An information processing system, comprising:
a circuit to control mounting or unmounting of a specified storage area to an operating system on the information processing system, to manage a first mount status indicating whether the specified storage area is to be mounted or unmounted and a second mount status indicating whether the specified storage area is to be presented to a user or not, and to control the specified storage area to not be presented on a display when the first mount status indicates that the specified storage area is to be mounted and the second mount status indicates that the specified storage area is not to be presented to the user.

* * * * *